US 8,935,732 B2

(12) United States Patent
Jenkin et al.

(10) Patent No.: US 8,935,732 B2
(45) Date of Patent: *Jan. 13, 2015

(54) DYNAMIC VIDEO SOURCE SELECTION FOR PROVIDING THE BEST QUALITY PROGRAMMING

(71) Applicant: EchoStar Technologies L.L.C., Englewood, CO (US)

(72) Inventors: Geraint Jenkin, Rhondda Cynnon Taf (GB); Marcus C. Liassides, Merthyr Tydfil (GB)

(73) Assignee: EchoStar Technologies L.L.C., Englewood, CO (US)

( * ) Notice: Subject to any disclaimer, the term of this patent is extended or adjusted under 35 U.S.C. 154(b) by 47 days.

This patent is subject to a terminal disclaimer.

(21) Appl. No.: 13/857,786

(22) Filed: Apr. 5, 2013

(65) Prior Publication Data

US 2013/0347045 A1 Dec. 26, 2013

Related U.S. Application Data

(63) Continuation of application No. 12/556,347, filed on Sep. 9, 2009, now Pat. No. 8,418,207.

(60) Provisional application No. 61/095,738, filed on Sep. 10, 2008.

(30) Foreign Application Priority Data

Dec. 5, 2008 (GB) .................................. 0822236.6

(51) Int. Cl.
*H04N 5/445* (2011.01)
*H04N 7/173* (2011.01)
(Continued)

(52) U.S. Cl.
CPC .............. *H04N 21/4622* (2013.01); *H04N 5/76* (2013.01); *H04N 5/85* (2013.01); *H04N 7/17318* (2013.01);
(Continued)

(58) Field of Classification Search
CPC .......... H04N 21/4622; H04N 21/4143; H04N 7/17318; H04N 21/44209; H04N 5/76; H04N 5/85; H04N 5/781
USPC ............... 725/59, 91, 93, 100, 109, 114, 116, 725/131, 139, 151; 386/200, 213, 219
See application file for complete search history.

(56) References Cited

U.S. PATENT DOCUMENTS

| | | |
|---|---|---|
| 4,535,355 A | 8/1985 | Arn et al. |
| 5,953,506 A | 9/1999 | Kalra et al. |

(Continued)

FOREIGN PATENT DOCUMENTS

| | | |
|---|---|---|
| CN | 101098458 A | 1/2008 |
| EP | 1914940 A1 | 4/2008 |

(Continued)

OTHER PUBLICATIONS

Canadian Intellectual Property Office, Office Action, dated Oct. 3, 2013 for Canadian Patent Application No. 2,736,330.
(Continued)

*Primary Examiner* — Hoang-Vu A Nguyen-Ba
(74) *Attorney, Agent, or Firm* — Ingrassia Fisher & Lorenz, P.C.

(57) ABSTRACT

A Dynamic Video Source Selection (DVSS) component that can be implemented in a physical or virtual STB that is capable of presenting a high quality service and consistent navigational paradigm to the viewer, while detecting, selecting, and presenting the best quality programming possible based upon the current position of the viewer's device within the network.

20 Claims, 24 Drawing Sheets

(51) Int. Cl.

| | | |
|---|---|---|
| H04N 7/16 | (2011.01) | |
| H04N 21/462 | (2011.01) | |
| H04N 21/218 | (2011.01) | |
| H04N 21/4143 | (2011.01) | |
| H04N 21/442 | (2011.01) | |
| H04N 21/443 | (2011.01) | |
| H04N 21/454 | (2011.01) | |
| H04N 21/61 | (2011.01) | |
| H04N 21/63 | (2011.01) | |
| H04N 21/643 | (2011.01) | |
| H04N 21/81 | (2011.01) | |
| H04N 21/258 | (2011.01) | |
| H04N 21/41 | (2011.01) | |
| H04N 21/418 | (2011.01) | |
| H04N 21/426 | (2011.01) | |
| H04N 5/765 | (2006.01) | |
| H04N 5/935 | (2006.01) | |
| H04N 5/932 | (2006.01) | |
| H04N 5/76 | (2006.01) | |
| H04N 5/85 | (2006.01) | |
| H04L 29/06 | (2006.01) | |

(52) U.S. Cl.
CPC ....... *H04N 21/2181* (2013.01); *H04N 21/4143* (2013.01); *H04N 21/44209* (2013.01); *H04N 21/443* (2013.01); *H04N 21/454* (2013.01); *H04N 21/6112* (2013.01); *H04N 21/6125* (2013.01); *H04N 21/631* (2013.01); *H04N 21/632* (2013.01); *H04N 21/64322* (2013.01); *H04N 21/8166* (2013.01); *H04L 65/4076* (2013.01); *H04L 65/1059* (2013.01); *H04N 21/25833* (2013.01); *H04N 21/4113* (2013.01); *H04N 21/4181* (2013.01); *H04N 21/42607* (2013.01); *H04N 21/4433* (2013.01)
USPC ............... 725/59; 725/91; 725/93; 725/100; 725/109; 725/114; 725/116; 725/131; 725/139; 725/151; 386/200; 386/213; 386/219

(56) References Cited

U.S. PATENT DOCUMENTS

| | | | |
|---|---|---|---|
| 5,999,979 | A | 12/1999 | Vellanki et al. |
| 6,003,045 | A | 12/1999 | Freitas et al. |
| 6,108,703 | A | 8/2000 | Leighton et al. |
| 6,195,680 | B1 | 2/2001 | Goldszmidt et al. |
| 6,366,614 | B1 | 4/2002 | Pian et al. |
| 6,490,627 | B1 | 12/2002 | Kalra et al. |
| 6,574,591 | B1 | 6/2003 | Kleiman et al. |
| 6,604,118 | B2 | 8/2003 | Kleiman et al. |
| 6,922,394 | B2 | 7/2005 | Kajiwara |
| 6,976,090 | B2 | 12/2005 | Ben-Shaul et al. |
| 7,133,368 | B2 | 11/2006 | Zhang et al. |
| 7,240,100 | B1 | 7/2007 | Wein et al. |
| 7,299,291 | B1 | 11/2007 | Shaw |
| 7,523,181 | B2 | 4/2009 | Swildens et al. |
| 7,567,897 | B2 | 7/2009 | Halcrow et al. |
| 7,590,703 | B2 | 9/2009 | Cashman et al. |
| 7,779,135 | B2 | 8/2010 | Hudson et al. |
| 7,861,273 | B2 | 12/2010 | Fries et al. |
| 8,332,905 | B2 | 12/2012 | Jenkin et al. |
| 8,418,207 | B2 | 4/2013 | Jenkin et al. |
| 2002/0026637 | A1* | 2/2002 | Markel et al. ................ 725/37 |
| 2002/0152318 | A1 | 10/2002 | Menon et al. |
| 2002/0162112 | A1 | 10/2002 | Javed |
| 2003/0014684 | A1 | 1/2003 | Kashyap |
| 2003/0151753 | A1 | 8/2003 | Li et al. |
| 2003/0154239 | A1 | 8/2003 | Davis et al. |
| 2004/0080863 | A1 | 4/2004 | Nakagawa |
| 2004/0083283 | A1 | 4/2004 | Sundaram et al. |
| 2004/0103444 | A1 | 5/2004 | Weinberg et al. |
| 2005/0021862 | A1* | 1/2005 | Schroeder et al. .......... 709/246 |
| 2005/0081218 | A1 | 4/2005 | Acott et al. |
| 2005/0108414 | A1 | 5/2005 | Taylor et al. |
| 2005/0120107 | A1 | 6/2005 | Kagan et al. |
| 2005/0188051 | A1 | 8/2005 | Sneh |
| 2006/0080718 | A1 | 4/2006 | Gray et al. |
| 2006/0101495 | A1 | 5/2006 | Yoshida et al. |
| 2006/0184972 | A1 | 8/2006 | Rafey et al. |
| 2006/0206246 | A1 | 9/2006 | Walker |
| 2006/0206581 | A1* | 9/2006 | Howarth et al. ............. 709/217 |
| 2006/0277316 | A1 | 12/2006 | Wang et al. |
| 2007/0121728 | A1 | 5/2007 | Wang et al. |
| 2007/0199039 | A1 | 8/2007 | Diroo et al. |
| 2008/0022084 | A1 | 1/2008 | Raftelis et al. |
| 2008/0046909 | A1 | 2/2008 | Smetana et al. |
| 2008/0060035 | A1 | 3/2008 | Tsang et al. |
| 2008/0069350 | A1 | 3/2008 | Reinoso et al. |
| 2008/0120671 | A1 | 5/2008 | Sim et al. |
| 2008/0141317 | A1 | 6/2008 | Radloff et al. |
| 2008/0219151 | A1 | 9/2008 | Ma et al. |
| 2008/0225698 | A1 | 9/2008 | Smith et al. |
| 2008/0244660 | A1 | 10/2008 | Wodka et al. |
| 2008/0301744 | A1 | 12/2008 | Hutchings |
| 2008/0307484 | A1* | 12/2008 | Dandekar et al. ........... 725/133 |
| 2009/0019480 | A1 | 1/2009 | White |
| 2009/0019505 | A1 | 1/2009 | Gopalakrishnan et al. |
| 2009/0052540 | A1 | 2/2009 | Gutman et al. |
| 2009/0063983 | A1 | 3/2009 | Amidon et al. |
| 2009/0077614 | A1 | 3/2009 | White et al. |
| 2009/0183213 | A1* | 7/2009 | Mukerji et al. ............... 725/95 |
| 2009/0241143 | A1 | 9/2009 | White et al. |
| 2009/0252329 | A1 | 10/2009 | Casey et al. |
| 2009/0284652 | A1 | 11/2009 | Bennett et al. |
| 2009/0300673 | A1 | 12/2009 | Bachet et al. |
| 2010/0017832 | A1 | 1/2010 | Wang |
| 2010/0186053 | A1 | 7/2010 | Zhang et al. |
| 2013/0007826 | A1 | 1/2013 | Jenkin et al. |

FOREIGN PATENT DOCUMENTS

| | | |
|---|---|---|
| WO | 2006122024 A3 | 11/2006 |
| WO | 2007113410 A2 | 10/2007 |

OTHER PUBLICATIONS

US Patent and Trademark Office, Notice of Allowance, mailed Nov. 25, 2013 for U.S. Appl. No. 13/610,608.

USPTO "International Search Report" mailed Dec. 12, 2008; International Appln. No. PCT/US2008/061035, filed Apr. 21, 2008.

Edwards, W. Keith et al. "An Extensible Set-Top Box Platform for Home Media Applications" IEEE 2005.

United Kingdom Intellectual Property Office, "Examination Report Under Section 18(3)," mailed Mar. 5, 2012; Application No. GB0822236.6.

United Kingdom Intellectual Property Office "Patents Act 1977: Search Report Under Section 17(5)," mailed Dec. 24, 2009; Application No. GB822236.6, filed Dec. 5, 2008.

European Patent Office, International Searching Authority, "International Search Report," mailed Dec. 29, 2009; International Application No. PCT/GB2009/002167, filed Sep. 10, 2009.

Peltotalo, Jani et al. "A Massively Scalable Persistent Content Distribution System," Proceedings of the Sixth IASTED International Conference on Communications, Internet, and Information Technology; Jul. 2-4, 2007, Banff, Alberta, Canada; ACTA Press, vol. 575, Jul. 2, 2007, p. 7PP, XP009126743; ISBN: 978-0-88986-673-7, p. 1, left-hand column, line 1-p. 3, right-hand column, line 14.

Couto Da Silva, Ana Paula et al. "A Bandwidth-Aware Scheduling Strategy for P2P-TV Systems," Peer-to-Peer Computing, 2008, P2P '08; Eighth International Conference on, IEEE, Piscataway, NJ, USA; Sep. 8, 2008, pp. 279-288, XP031322350; ISBN: 978-0-7695-3318-6, p. 279, left-hand column, line 26-p. 279, right-hand column, line 17.

Clover, Julian, "Magnet pulls in Igloo PCTV Solution", http://www.broadbandtvnews.com/?o=8027 (Sep. 10, 2008), 1-3.

(56) References Cited

OTHER PUBLICATIONS

Harris, Jan, "Inuk Networks announces launch of igloo set-top box", httQ :/ /www. iQtv-watch .co. u k/20092007 -in u k -networks-an nou nces-lau nch-of -igloo-settoo-box.html (Sep. 20, 2007), 1-5.

InformiTV.com, "Inuk igloo provides cool set-top box for personal computers", http:/linformitv.com/news/2007/09/12/inukialooprovides/ (Sep. 12, 2007), 1-2.

ITVT, "Inuk Launches PC-Based Virtual Set-Top Box, "Igloo"", httQ://blog.itvt.com/storw1444/inuk-launches-Qc-based-virtual-set-toQ-box-igloo, (Oct. 15, 2007), 1-4.

ITVTWP, "Inuk Integrates SecureMedia's CNDRM Technology with igloo", httQ :/ /blog. itvt. com/2008/1 0/06/m ag net-networks-selects-in u ks-ig loo-vi rtu al-set-toQbox-software/, (Oct. 6, 2008), 1-3.

Wesleyclover.com, "Inuk Networks Launches World's first PC-based Virtual Set-top Box; Delivering a True Television Experience to the PC", httQ://wesle~clover.com/index.QhQ?OQtion=comcontent&task=view&id=448&1temid=1~ (Sep. 7, 2007), 1-2.

USPTO "Non-Final Office Action" mailed Apr. 25, 2013 for U.S. Appl. No. 13/610,608.

* cited by examiner

DYNAMIC VIDEO SOURCE SELECTION FOR PROVIDING THE BEST QUALITY PROGRAMMING

RELATED APPLICATIONS

This application claims the benefit of U.S. Provisional Application No. 61/095,738, filed Sep. 10, 2008, which is hereby incorporated by reference. This application is related to co-pending U.S. application Ser. No. 12/556/443 entitled "Virtual Set-Top Box," filed herewith, which is incorporated herein by reference.

TECHNICAL FIELD

Embodiments of the present invention relate to Internet Protocol Television (IPTV) technology and, specifically, to emulating a physical set-top box (STB) for providing an IPTV service to a user such that the user may view programming content on a device such as a computing device, the presentation and functionality associated with traditional programming paradigms being maintained.

BACKGROUND

In the traditional television paradigm, programming content is sent as an analog or digital signal to a viewer's television set via cable, satellite or through the air. The signals are then received, processed and displayed for the viewer to watch on the screen of the television set.

However, with the exoteric spread of portable electronic devices, such as laptop computers, viewers no longer wish to be restricted to watching television via a conventional television set which is, more or less, confined to use in one physical location. Given the desire or need for portability, and the ubiquitous presence of Internet-based technologies within modern computing equipment, the ability to receive IPTV services via computing equipment is becoming increasingly important from both a consumer's (i.e. viewer's) perspective and from the perspective of the service providers who seek to commercialize the opportunities.

Thus, the monopoly of the traditional television paradigm is being eroded and challenged by the development of Internet Television (Internet TV) and Internet Protocol Television (IPTV) technologies.

Internet TV enables a user to select programs from a list and is typically delivered over an IP network in the form of streaming video via a website. The content is embedded into a web page, and accompanying text is typically wrapped around the streaming video which is presented to the viewer within a separate window. In some ways, this presentation style is similar to a newspaper page wherein surrounding text flows around, not over the image, albeit that the static image is replaced by a video component.

By contrast, a typical IPTV system enables delivery of a digital television service to a viewer over a closed network infrastructure. The delivery is performed using Internet Protocol and typically includes a broadband connection. The IPTV system receives and displays the video stream, which has been encoded as a series of Internet Protocol (data) packets. IPTV can be in the form of live TV, but also as stored video—sometimes known as 'video on demand' (VOD).

Traditionally, the viewer must use a device known as a set-top box (STB) in conjunction with his/her television set in order to receive and view IPTV. The set top box acts as an interface between the television and the network, decoding the incoming video streaming media, converting it into standard television signals and providing two-way communications over the IP network. It also performs functional processing, such as setting up the connection and quality of service (QoS) with the service node, channel change functionality and user display control. This functionality is achieved via the use of software known as 'middleware'.

'Middleware' is a key component within the IPTV solutions architecture. It is the application software layer that acts as an interface between the user interface and the hardware/operating system (OS) of the STB. Middleware vendors adopt abstraction based strategies to isolate themselves from the underlying hardware.

However, service providers can find it challenging to make the IPTV business model commercially viable due to the (often relatively high) cost of STBs. This is compounded by the linear nature of the cost/functionality line of STBs—the more features or functions the STB is required to posses, the higher the cost of the device. This has prompted IPTV service providers to investigate the possibilities of delivering their services to mass market end user devices (such as personal computers) where the cost of the hardware has already been borne by the end user/viewer. Thus, if standard computing components can be used to mirror and mimic their televisual counterparts (e.g. monitor, CPU, disk used to replace TV, STB, VCR respectively) then functionality can be maintained while eliminating the cost and inconvenience of a required STB.

FIG. 1 illustrates how, in a traditional IPTV architecture 100 including a physical STB 120, IPTV content is delivered to a viewer's television set 120 such that the presentation style of the IPTV content is the same as that experienced by the viewer when using a non-IPTV based delivery system (e.g., TV broadcasts over the air). As FIG. 1 shows, signals are transmitted from the service provider over a network, and are forwarded by a router to the viewer's STB. The STB, which is connected to the viewer's television set, processes the signals such that the content can be displayed on the television screen in a style and format identical to that experienced in the more 'traditional' television broadcasting paradigms.

BRIEF DESCRIPTION OF THE DRAWINGS

The invention may be best understood by referring to the following description and accompanying drawings that are used to illustrate embodiments of the invention. In the drawings.

DETAILED DESCRIPTION

Figure 1:
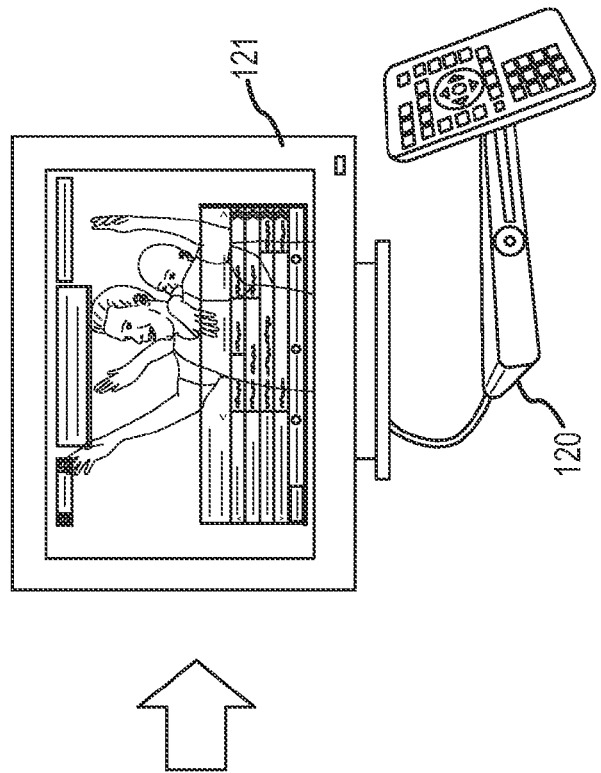
FIG. 1 shows the architecture of a typical, traditional IPTV system which utilizes a physical STB.
Figure 1:
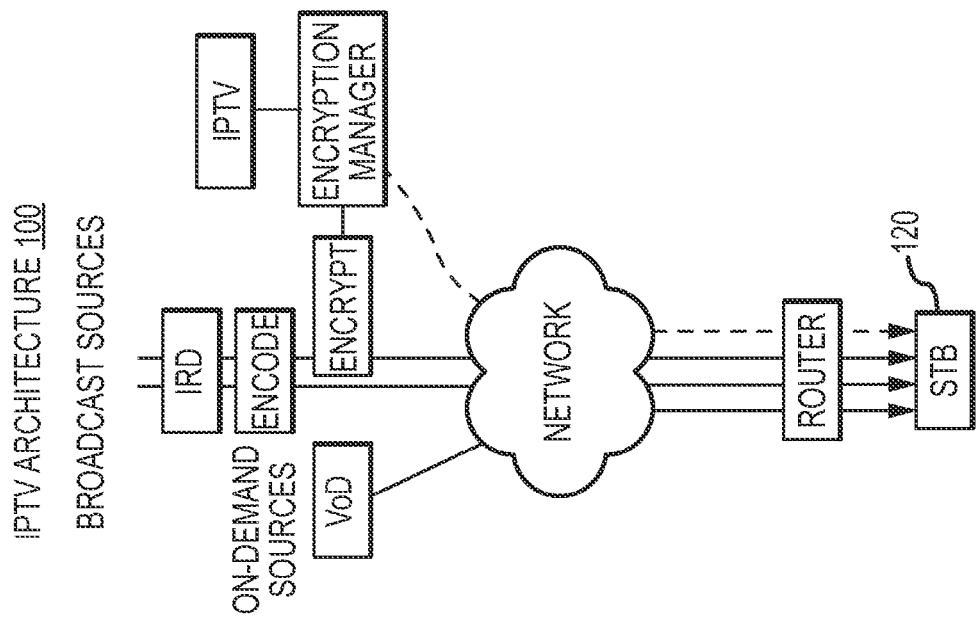

The following description describes embodiments of a virtual set-top box (vSTB) for executing a middleware component, designed for execution by the physical STB, including emulating hardware capabilities of the physical STB to process IPTV content received over a network connection. The middleware component is a container framework in which applications can operate. The middleware component may be the application software layer that acts as an interface between the user interface and the hardware and operating system of the STB, or in the case of vSTB, the hardware and operating system of the client device (not a physical STB). For example, the middleware component may be an operating system layer designed for consumer electronics, such as for physical set-top boxes, that connect to a service provider's system, such as OpenCable Application Platform used for cable television systems. The middleware component is typically specific to the particular vendor of the television services.

The following description also describes embodiments of a DVSS component that can be implemented in a physical or virtual STB that is capable of presenting a high quality service and consistent navigational paradigm to the viewer, while (transparent to the user) detecting, selecting, and presenting the best quality programming possible based upon the current position of the viewer's device within the network (regardless of multicast support). The DVSS component may be used to provide the user with a single experience, of optimal quality, regardless of the network in which the client device operates. In one embodiment, the DVSS component determines and acquires the optimal quality programming possible based on the current position of the user's device within the network, for example, the DVSS component can issue a request to a first source using a first protocol and, upon determining that the request fails, re-issuing the request to a second source using a second protocol. The DVSS component can receive the requested media content using the particular protocol used by the particular delivery network used by the selected source. For example, the media content can be received in one of the different protocols, for example, RSTP, Internet Group Management Protocol (IGMP), Digital Video Broadcasting (DVB), or others, such as peer-to-peer (P2P), streamlets (e.g., HTTP streamlets) described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. Many of the functional units described in this specification have been labeled as modules, engines, or managers, in order to more particularly emphasize their implementation independence. For example, a module may be implemented as a hardware circuit including custom integrated circuits or gate arrays, off-the-shelf semiconductors such as logic chips, transistors, or other discrete components. A module, engine, or manager may also be implemented in programmable hardware devices such as field programmable gate arrays, programmable array logic, programmable logic devices, or the like. These modules, engines, and managers may also be implemented in software for execution by various types of computing devices. An identified module of executable code may, for instance, include one or more physical or logical blocks of instructions, which may, for instance, be organized as an object, procedure, or function. Nevertheless, the executables of an identified module need not be physically located together, but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computing device, or similar electronic computing device, that manipulates and transforms data represented as physical (electronic) quantities within the computing device's registers and memories into other data similarly represented as physical quantities within the computing device memories or registers or other such information storage, transmission or display devices.

The embodiments described herein may remove the need for a traditional (i.e. physical) STB and/or television set, and provides, in one embodiment, a software-based emulation environment such that the signals can be received, processed and viewed on an alternative device, such as a portable computing device (e.g., laptop computer), without loss or adaptation of service, presentation style or functionality. The embodiments may also be used in connection with a physical STB and/or television set.

Figure 2:
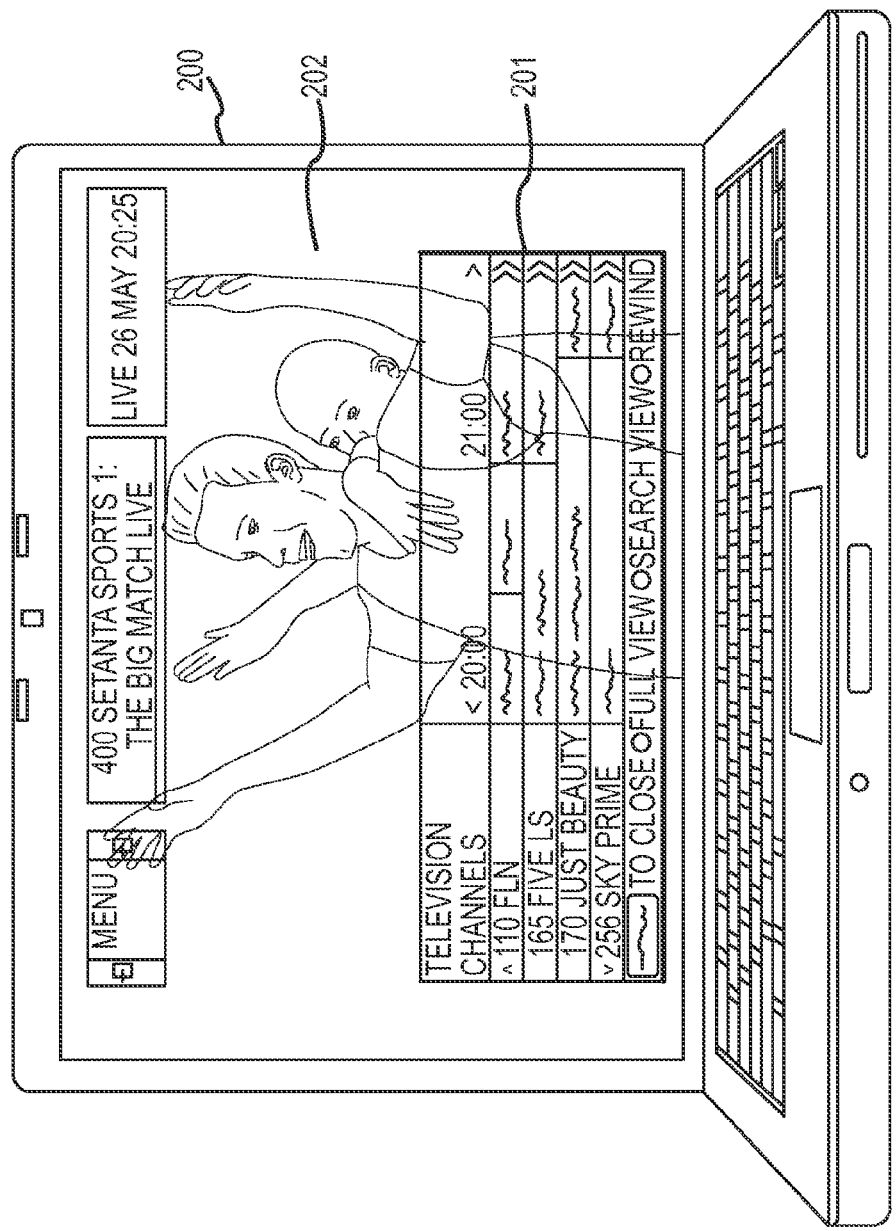
FIG. 2 shows a computing device executing a $3^{rd}$ party middleware running in conjunction with an STB emulation system according to one embodiment, despite the middleware having been designed for use with a traditional STB.

This maintenance of viewing experience is illustrated in FIG. 2, which shows a laptop computer 200 executing a $3^{rd}$ party middleware running in conjunction with an STB emulation system according to one embodiment, despite the middleware having been designed for use with a traditional STB. FIG. 2 also illustrates how the STB emulation system has been architected to deliver a rich multi-media televisual experience akin to that traditionally associated with a physical STB and television set. The image shows the end result of how the $3^{rd}$ party middleware has elected to render the user interface 201 and video layers 202 with respect to each other, instead of wrapping the graphics and or text around the video, as done in conventional web television.

Thus, the functional components of the virtual set-top box (also referred to as the STB emulation system), as described in the embodiments herein allow the middleware to define the exact co-ordinates of each visual element in all three planes (X, Y and Z). The Z-plane also includes the ability to apply alpha blending techniques to vary the opacity of the User Interface (UI) layer with respect to the video layer.

In order to receive IPTV services and view them on another alternate electronic device, such as a personal or laptop computer, the electronic device itself performs the functional processing described herein in relation to the STBs used with televisions, but does so by executing a middleware component, designed for execution by a physical STB, including emulating hardware capabilities of the physical STB to process IPTV content as if the electronic device were a physical STB.

The embodiments described herein describe a system which provides the seamless delivery of IPTV services to an alternative device such as a computing device, such as the laptop computer 200 illustrated in FIG. 2. Ideally, such a system would be arranged and configured such that it can be integrated with existing IPTV technologies. This integration work involves primarily three areas: 1) Video delivery: some embodiments are based on standard broadcast technologies, and not those which have emerged in relation to web-based (Internet TV) services. This is because of the difference in viewing experiences described herein; primarily in the segregation of text and moving images. 2) Conditional Access (CA): service providers require a means of controlling and managing access to the services. Each provider may have a different mechanism for controlling and managing access to the services. Subscribers may opt for varying levels of service, and thus access to the content must be controlled via a conditional access (CA) system. This is typically implemented via the use of virtual or traditional hardware 'smart cards' used in conjunction with STBs. Ideally such a system is managed from a single installation of the customer's CA head-end and allows rights to be managed seamlessly over heterogeneous display devices. 3) Middleware: middleware plays a key role in any IPTV system, and determines the presentation layer of most services. The choice of middleware is determined by the viewer's chosen service provider and is typically of a client/server architecture, the client residing on the STB. Typically, middleware includes an application management component, an execution environment, and the ability to access libraries (Application Programming Interfaces—known as APIs) to control the underlying hardware/OS.

Broadly speaking, known $3^{rd}$ party middleware can be categorized into two types:

i) Category I middleware: middleware which is embedded within the Document Object Model (DOM) of a STB's embedded browser. These products use vendor-provided extensions to that environment, in the form of scripting language libraries (e.g., ECMAScript libraries), to control the media management elements of the service and utilize standards based rendering technologies to render their user interfaces—such as Hypertext Mark-up Language (HTML) and Scalable Vector Graphics (SVG); or ii) Category II middleware: middleware that is written directly on top of the low-level APIs (typically implemented in languages such as C or C++) provided by the STB vendors to control the media management elements of the service and typically utilize proprietary-based rendering technologies to render their user interfaces.

Both approaches suffer from the problem that the STB vendor provided APIs (both ECMAScript and C/C++) are not standardized and, therefore, each middleware vendor must perform a 'porting' exercise each time a new STB is to be added to their portfolio of supported end user devices.

Another problematic area facing computer-based IPTV systems (e.g., would-be computer-based IPTV systems that don't use a physical STB) is that most known IPTV systems are designed to deliver IP encapsulated MPEG-2/4 content at 2 to 4 Mbps to users on multicast enabled networks. To date, the general lack of multicast support within large portions of the available networks restricts the number of potential target clients. There are several commercial and technical factors in existence, which remain barriers to the effective delivery of these services.

End users of television services are typically unconcerned with the underlying delivery mechanism employed to deliver the picture to their device (e.g. Digital Terrestrial Television (DTTV or DTT), IPTV, etc.). However, they are concerned about the quality of the content which they wish to view and the ease of use with which they access that optimal-quality content.

Therefore, in some embodiments described with respect to the DVSS component, the system is capable of presenting a high quality service and consistent navigational paradigm to the viewer, while (transparent to the user) detecting, selecting and presenting the best quality programming possible based upon the current position of the viewer's device within the network (regardless of multicast support).

Known solutions attempt to address some of these difficulties, although they typically involve considerable expense from the service provider, in terms of both development and operational overheads, to effectively create a parallel distribution mechanism (encoding, encryption, delivery, middleware integration, device integration etc.), and typically provide a different viewing experience (in terms of presentation style and format, navigational interfaces etc.) from that which the viewer would expect from a traditional television based service.

In addition, many proposed solutions focus on how to deliver IPTV content to an end user, rather than how to process and/or display that content once it has been received at the client end, or how to improve/replace the technology employed at the client end.

For example, EP1895777 A1 discloses a method of providing an IPTV service to a subscriber, and a network element for executing said method. This is achieved by introducing an additional tier (an 'intertwine' tier) into the traditional 3 tiered IPTV architecture. This intertwine tier includes IPTV service routers and a communication network, thus enabling provision of an IPTV service between different networks which may belong to different operators and/or be installed in different countries. Thus, the disclosed method and element add roaming functionality to the existing IPTV service.

However, the method and element disclosed in EP1895777 A1 do not enable a subscriber to receive and display ITPV content on an alternative device, such as a computing device operating a STB emulation system. Instead, the disclosed method provides an alternative architecture for delivery of the programming content to the subscriber and does not address the issues discussed above concerning the technology employed at the client end.

Similarly, WO 2008/045384 A2 discloses an IPTV transport architecture with double layer encryption and bulk decryption. The disclosed transport architecture is designed to operate in accordance with a client's traditional television/STB combination, and does not provide a means of presenting the programming content on an alternative device operating a STB emulation system.

A number of systems are known in relation to STB simulation, for the purpose of testing constrained, isolated aspects of IPTV service delivery. For example, the solution disclosed in EP 1914940 A1 provides a test apparatus for assessing the quality of an IPTV service, and to locate and repair malfunctions. The test apparatus accesses the IPTV network (from a central office) as a simulation of the user's STB, receives and analyses channel information and media contents downloaded from the IPTV network, and then generates test results. This obviates the need for an operator to enter the user's premises and perform the test routine using manual test apparatus. Thus, the STB simulation performed by the disclosed solution is limited such that it only simulates the way in which the STB presents itself to the network and receives information from the network. It does not present a fully operable STB emulation system which could be used to replace a user's STB and television and present the received content to the viewer. Thus, it does not provide a means of performing all the functions required and expected of a physical STB.

Similarly, US 2002/0026637 A1 discloses a computer program which allows a personal computer to emulate the functions of various STBs so that a combined video and an enhanced content stream can be displayed and randomly accessed to ensure that a desired layout is achieved with respect to the displayed content. The program is designed to facilitate quick and easy checking of the quality of the content presentation, with modification to the combined content stream being permitted during the checks if required. Thus, only one aspect of a traditional STB functionality is addressed by the disclosed solution, which does not provide a complete, alternative system for use in presenting IPTV content to an end user. The disclosed solution provides a means of pre-viewing video and interactive content by a producer rather than presenting a complete service to a user.

Neither US 2002/0026637 A1 nor EP 1914940 A1 address the problem of integrating different forms of existing middleware products with a STB emulation system. Neither do they include simulation components to support or emulate other traditionally required functions such as conditional access and other network management functions.

Figure 3:
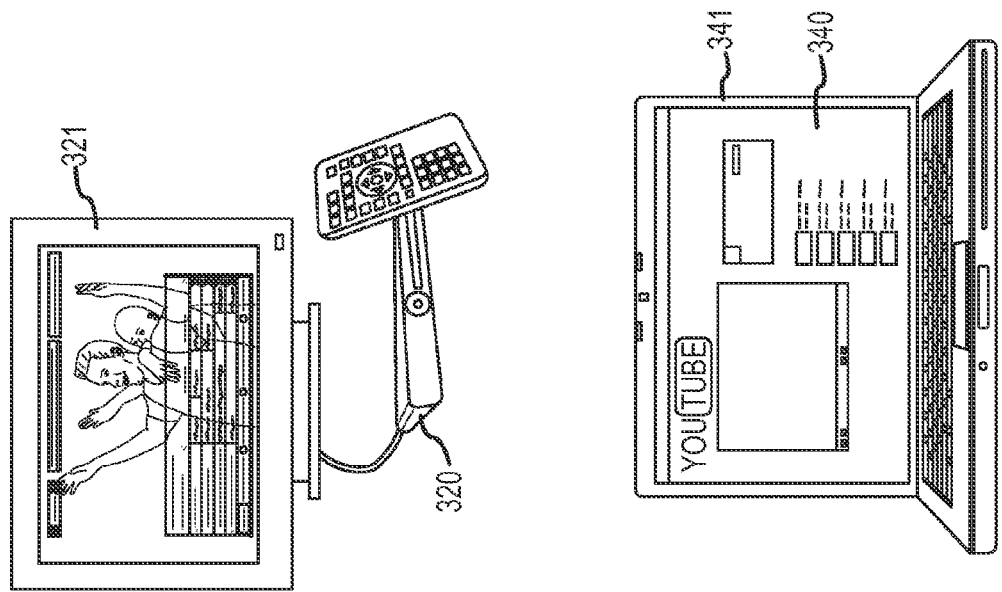
FIG. 3 shows how the architecture of traditional IPTV and web TV systems duplicate each other's core functions, and also shows the different presentation styles when content is displayed for viewing on the different end devices.
Figure 3:
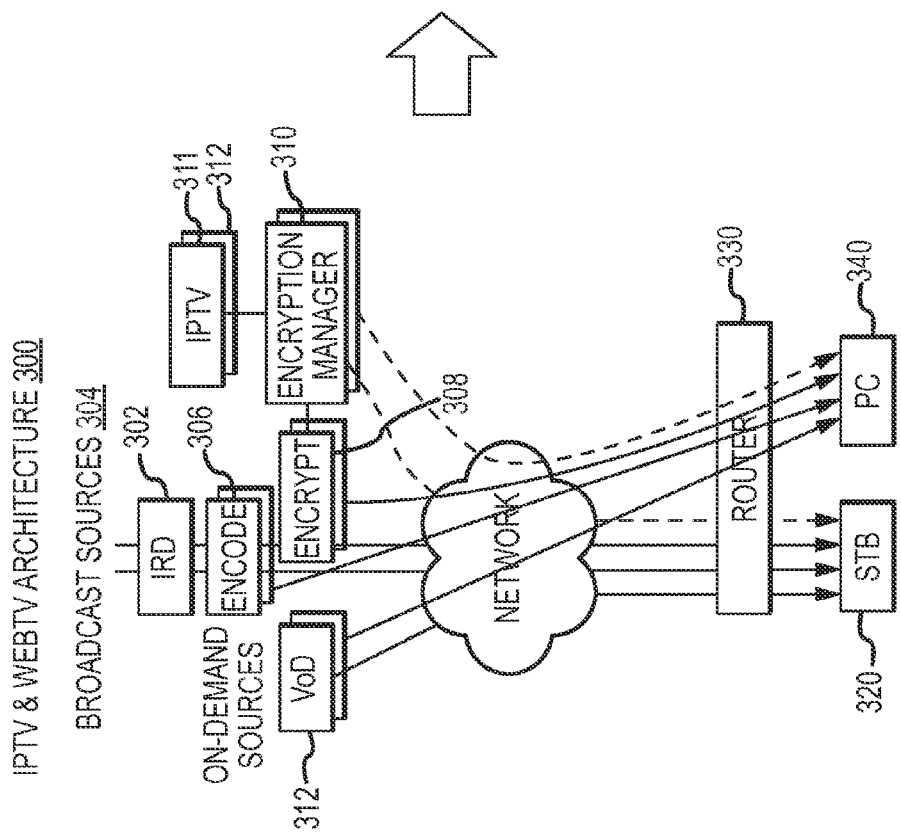

FIG. 3 shows how the architecture of traditional IPTV and web TV systems duplicate each other's core functions, and also shows the different presentation styles when content is displayed for viewing on the different end devices (i.e. a television plus physical STB displaying IPTV content versus a computing device displaying web TV content). In particular, the architecture 300 includes an integrated receiver/decoder (IRD) 302 that receives signals from one or more broadcast sources 304, duplicate encoders 306 that encode the IPTV content and the web TV content separately, duplicate encryptors 308 that encrypt the IPTV content and the web TV content separately, and duplicate encryption managers 310 that manage access to the encryption separately for IPTV content 311 and web TV content 312. Similarly, the architecture 300 may include duplicate on-demand sources 312 for VOD content for IPTV content and web TV content. The physical STB 320 communicates with the IPTV head-end system in the architecture 300 over the network by way of router 330 in order to present IPTV content on a television 321. The computing device 340 (e.g., PC) communicates with the duplication components of the architecture 300 in order to present web TV content on a display 341 of the computing device 340.

Figure 4:
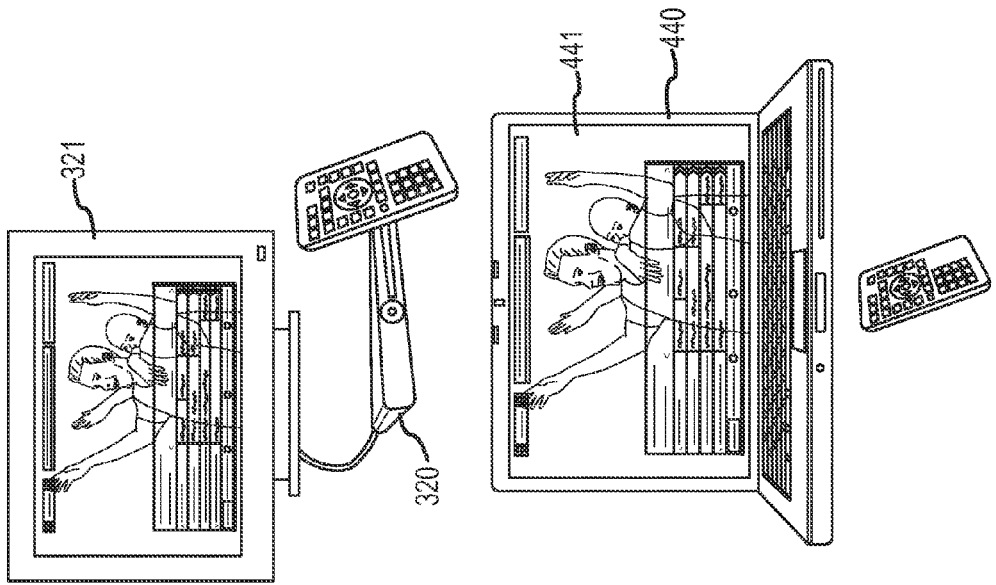
FIG. 4 shows how an STB emulation system according to one embodiment eliminates or minimizes the duplication of core functions while providing content to either a television plus STB or a computing device being used in conjunction with an STB emulation system according to one embodiment, and also maintaining the presentation style of the content for the viewer.
Figure 4:
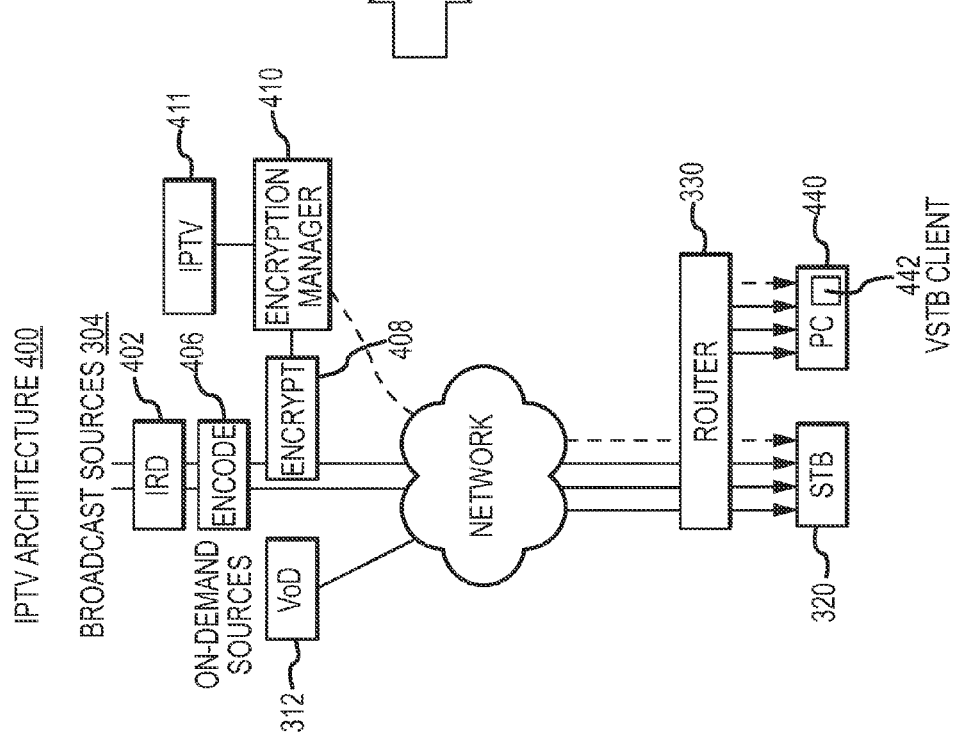

As shown in FIG. 3, operators are typically forced to consider an almost complete duplication of their television infrastructure when they decide to target devices such as PCs with services. This is generally because the protocols and technologies associated with web TV delivery, as well as its navigational paradigms, differ from those of IPTV implementations. This is largely a result of technological limitations than choice. When considering web TV services, operators are usually forced to transrate or transcode their existing content into a more PC 'friendly' format, such as, for example, Windows Media and Flash formats. This then requires the employment of alternative Conditional Access and Digital rights Management (DRM) strategies, and must finally re-design their whole UI/presentation layer to overcome the non-TV nature of their target device. This leads, generally, to implementations where text flows around (not over) the video. FIGS. 1, 3 and 4 emphasize the point by illustrating the result of each of the architectures on the services that can be delivered to the end user.

FIG. 4 shows how an STB emulation system according to one embodiment eliminates or minimizes the duplication of core functions while providing content to either a television plus STB or computing device being used in conjunction with a STB emulation system according to one embodiment, and also maintaining the presentation style of the content for the viewer. In particular, the architecture 400 includes an integrated receiver/decoder (IRD) 402 that receives signals from the one or more broadcast sources 304, an encoder 406 that encodes the IPTV content, an encryptor 408 that encrypts the IPTV content, and an encryption manager 410 that manages access to the encryption for IPTV content 411. Similarly, the architecture 400 may include duplicate on-demand sources 412 for VOD content for IPTV content. The physical STB 320 communicates with the IPTV head-end system in the architecture 400 over the network by way of the router 330 in order to present IPTV content on the television 321. The computing device 440 (e.g., PC), which includes the vSTB client 442 (also referred to as the STB emulation system) as described herein, communicates with the same IPTV head-end system in the architecture 400 in order to present IPTV content on a display 441 of the computing device 440. As shown in FIG. 4, the STB emulation system may eliminate or minimize the duplication of core functions while providing IPTV content to either the television 321 using the physical STB 320 or the computing device 340 being used in conjunction with the STB emulation system according to one embodiment. FIG. 4 also shows how the presentation style of the IPTV content for the viewer is maintained, unlike in the web TV content on the display 341 of the computing device 340.

Figure 5:
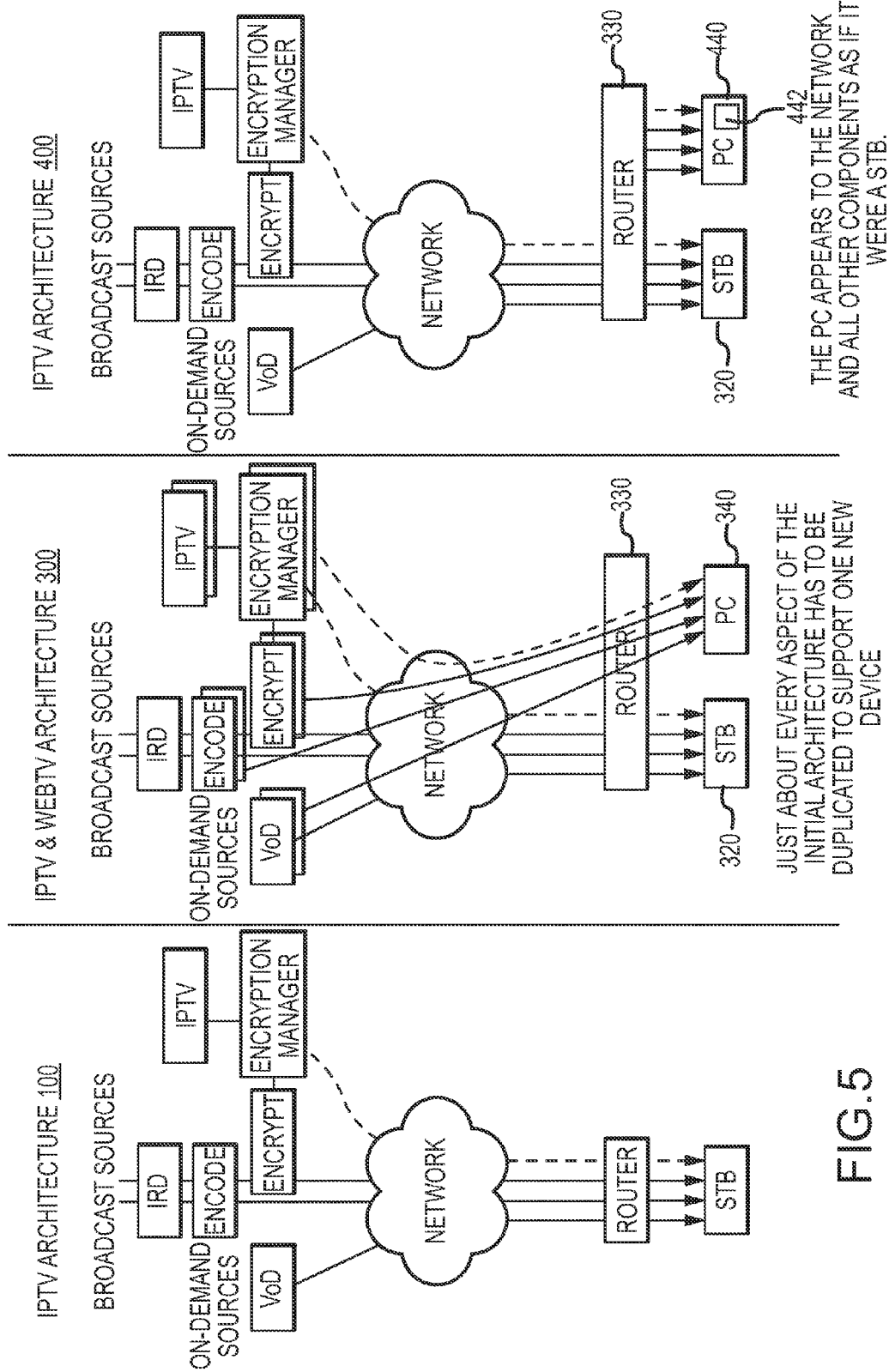
FIG. 5 shows the reduction in effort and expense required on behalf of the service provider when using an STB emulation system according to one embodiment.

FIG. 5 shows the reduction in effort and expense required on behalf of the service provider when using an STB emulation system according to one embodiment.

FIG. 5 shows side-by-side comparison of the IPTV architectures as described above. As shown in FIG. 5, using the computing device 440, which include the vSTB client 442, the computing device 440 appears to the network, as well as to other components, as if it were a physical STB, whereas the computing device 340 requires duplication of just about every aspect of the initial architecture 100 to support one new type of device (e.g., a personal computer). The architecture 400 reduces the expense and effort for a service provider to provide IPTV services to physical STBs 320, since the cost of the computing devices that implement the vSTB client 442 has already been born by the subscribers, as described herein.

Figure 6:
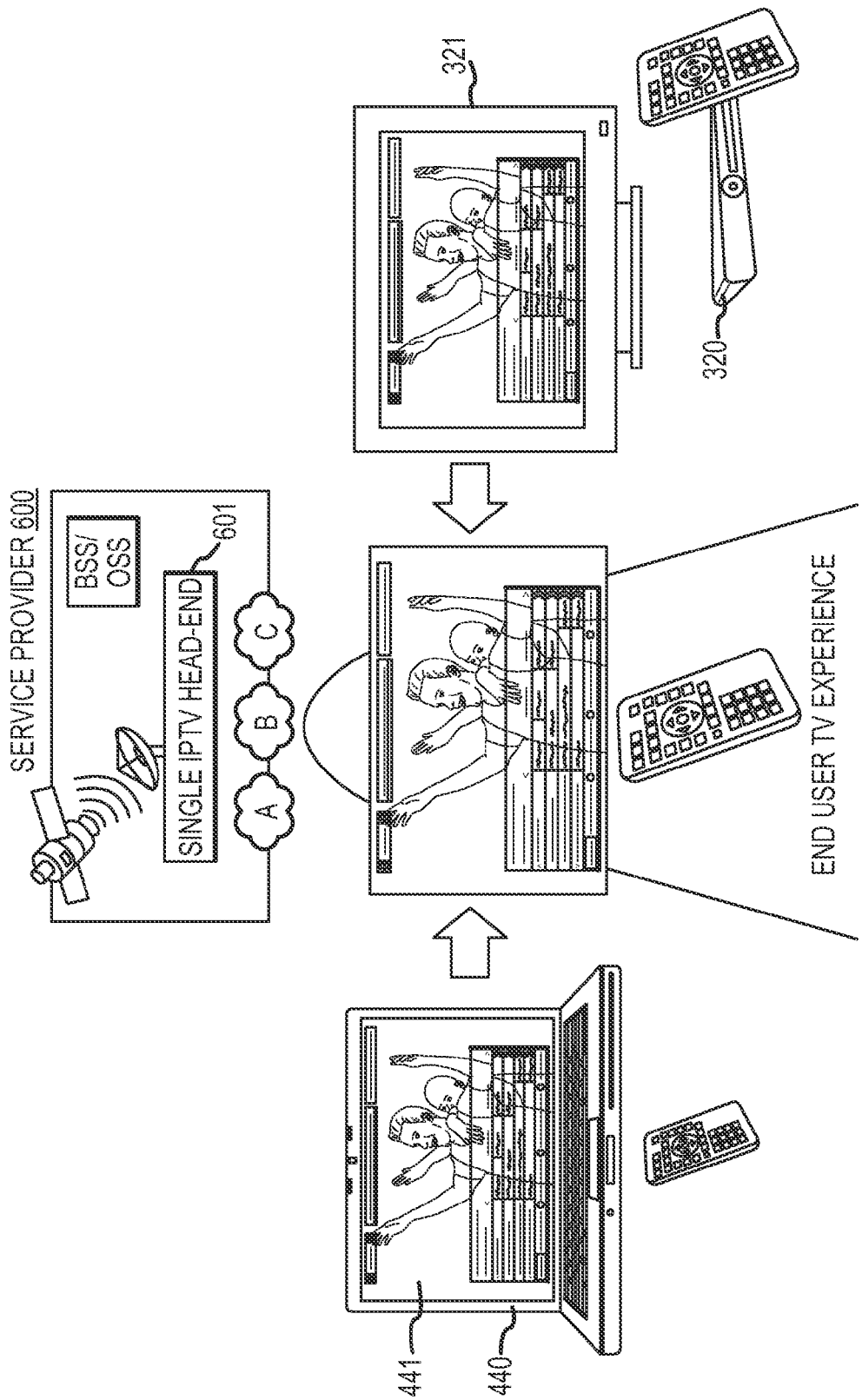
FIG. 6 shows how the televisual presentation of the service is preserved regardless of the device used to present the content according to one embodiment.

FIG. 6 shows how the televisual presentation of the service using the architecture 400 is preserved regardless of whether the IPTV content is provided to the physical STB 320 or the computing device 440, whichever is used to present the IPTV content according to one embodiment. In particular, a service provider 600 can use a single IPTV head-end system 601 to deliver IPTV content to subscribers despite whether the IPTV content is presented on the television 320 using the physical STB 321 or on the display 441 of the computing device 440. In either case, the presentation of the IPTV content of the end-user TV experience is the same or is similar.

The embodiments described herein may provide a means for receiving IPTV services on a user's device, and presenting the IPTV content on the device, such that the viewer enjoys continuity of programming service regardless of his/her physical location or the underlying hardware/software platform of the device. In one embodiment, the user's device acts as an alternative to a traditional television and STB combination. In a typical embodiment, said device is a personal or laptop computer, although other electronic devices may be used. The embodiments described herein may provide a system and method for the simulation of a physical STB, and to enable standard computing components to minor and mimic their televisual counterparts (e.g. monitor, CPU, disk->TV, STB, and VCR). The embodiments described herein can be easily integrated with known IPTV technologies, for example, the virtual STB may present itself to the IPTV head-end system as if it were a physical STB, and may execute the middleware component that has been designed for execution on the physical STB. The embodiments described herein may maintain substantially the same viewing experience as that experienced by a user when receiving and viewing televisual services via traditional (i.e. television plus physical STB) or alternative technologies. In other words, the content, navigational paradigm, presentation and quality of service may be substantially the same as those enjoyed by users of traditional IPTV systems (i.e., a physical STB being used in connection with a television set). For example, when viewing said televisual content, the navigational and presentation styles are maintained, and the format of the content is the same or substantially the same as that experienced by a viewer using a physical STB and television set.

The embodiments described herein provide a means for emulation of a traditional (physical) STB such that a virtual STB environment is created within the viewer's computing device. In addition to the virtual STB environment, there is provided a set of core APIs which act as conduits into the $3^{rd}$ party middleware executing within the virtual (i.e. emulated STB) environment. The APIs service requests made by external applications and expose the functionality of the middleware to those applications. Thus, the STB emulation system operates in conjunction with the set of core APIs to enable the maintenance of connectivity between standard category I and II middleware and the IPTV service provider. In one embodiment, in order to facilitate management from the network operator perspective, there needs to be direct access into the embedded middleware by the service provider. If the middleware belongs to category I, this is achieved by DOM connectivity. If, however, the middleware belongs to category II then connectivity is achieved via the middleware's APIs which connect to the set of core APIs. Thus, the emulated environment as described herein is agnostic to $3^{rd}$ party middleware connectivity.

In one embodiment, the emulation is achieved by a software-based system which creates a virtual STB environment for other (known) software to interact with, such that the emulation system running on the computing device presents itself to the network (and service provider) as if it were a physical STB connected to a television. The embodiments described herein may be resource efficient (especially in respect to CPU usage and memory).

In one embodiment, $3^{rd}$ party middleware, appropriate to the viewer's chosen service provider, is embedded within the emulation system. The emulation system acts as a wrapper around the $3^{rd}$ party middleware. In one embodiment, a STB emulation system is installed on the end user's (i.e. viewer's) device, said emulation system encapsulating $3^{rd}$ party middleware which is appropriate for and compatible with the delivery system deployed by the user's chosen IPTV service provider. In one embodiment, the STB emulation system provides an API-based STB emulation environment within which known $3^{rd}$ party middleware (both category I and II) is able to execute. The execution and performance of the middleware is preserved in its traditional form, and the $3^{rd}$ party middleware interacts with the virtual STB environment as it would with a traditional STB operating within a traditional IPTV system. In this embodiment, no modification of the vendor's middleware is required. These embodiments allow the viewer to view televisual content on an electronic device such as a personal or laptop computer, or other electronic device, by providing a virtual STB environment within the device, said virtual environment being able interface and interact with known 3$^{rd}$ party middleware such that all aspects of functionality, performance and presentation formats are substantially identical to those enjoyed by users of a traditional IPTV (i.e. STB plus TV) configuration.

It should be noted that a typical embodiment of the emulation system described herein provides at least two sets of distinct APIs:

1) the set of APIs which are embedded within the proprietary browser's DOM, providing genuine STB API emulation. These are written in a scripting language, such as, for example, ECMAScript, so as to enable their integration with the embedded browser which forms a sub-component of the STB emulation component; and 2) the set of APIs which are provided to enable the integration of 3$^{rd}$ party vendor middleware. These are written in a language, such as, for example, C or C++, and provide an extensible interface between the 3$^{rd}$ party category II middleware and the underlying STB features. The set of APIs are the fundamental links into the middleware encapsulated or nested within the emulated environment. The set of APIs virtualizes the core functions and hardware of the traditional (physical) STB as listed above.

Figure 7:
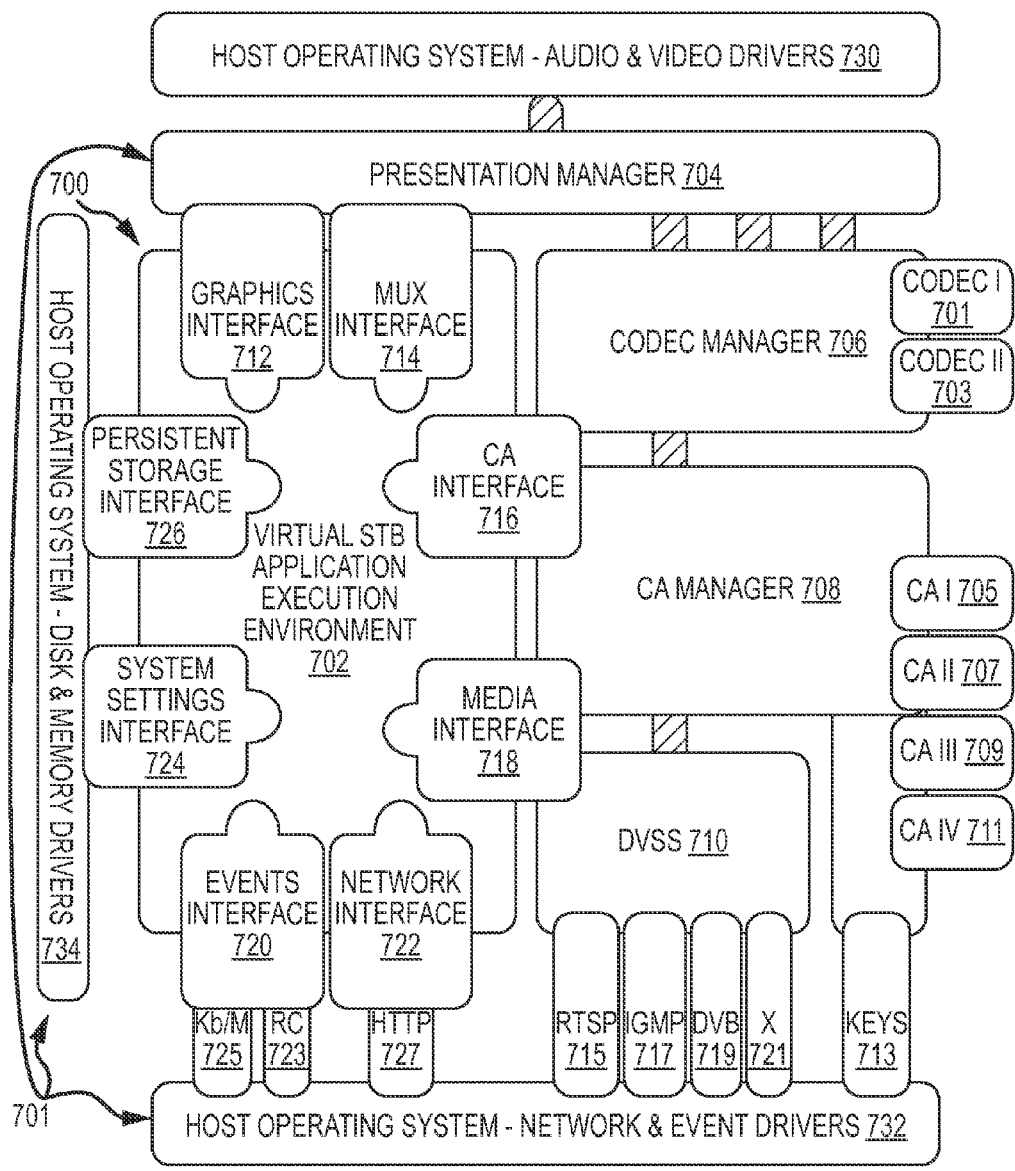
FIG. 7 shows the primary components of an STB emulation system for presenting IPTV content to a user on an electronic device according to one embodiment.

FIG. 7 shows the primary components of STB emulation system 700 for presenting IPTV content to a user on an electronic device according to one embodiment of the present invention. In this embodiment, application programming interfaces (APIs) 712-726 provide the interfaces between the OS 701 and the vSTB emulated environment 702 in which a middleware component is executed. The emulation system 700 includes the middleware component (not illustrated in FIG. 7) which is executed in the VTSB application execution environment 702, and multiple STB emulation components (also referred to as management components) 704-710, which are arranged and configured to emulate the capabilities of a physical STB. FIG. 7 shows how multiple interfaces 712-726 are provided to enable communication between the OS 701 and the (category I or II) middleware component which is embedded within the emulated environment 702. Said interfaces act as conduits for communication between the OS 701 and components 704-710 of the emulated STB environment 702. As such, the interfaces 712-726 provide the fundamental links between the 3$^{rd}$ party middleware component embedded within the emulated environment 702.

The emulation components of the depicted embodiment include a presentation manager 704, a codec manager 706, a conditional access (CA) manager 708, and a DVSS component 710. Alternatively, other interfaces may be included so as to extend the set of capabilities or, alternatively, some interfaces described below may not be required in alternative embodiments.

The presentation manager 704 communicates with the host operating system 701, such as with the audio and video drivers 730, to control the presentation of the IPTV content and a user interface (UI) on the display 441 of the computing device 440. The presentation manager 704 refreshes the display 441. The graphics interface 712 provides the middleware component with the emulated STB environment 702 with a mechanism to inform the underlying graphical subsystem (e.g., audio and video drivers 730 and presentation manager 704) that something has changed and that underlying graphical system should now refresh itself. The MUX interface 714 may be used to enable the middleware component to control the UI and video mixing capabilities (e.g., including chroma keying and alpha blending).

The codec manager 706 manages the encoding and/or decoding of the IPTV content (e.g., digital data stream or signal), for example, using Codec I 701 and Codec II 703. In this embodiment, the system can have one or more different codecs that can support various types of formats, such as MPEG-1, MPEG-2, MPEG-4, WMV, Flash, VC1, Flash, or the like, as represented by the Codecs I and II 701 and 702. These codecs 701 and 702 can operate simultaneously, concurrently, or individually. In one embodiment, the codecs are software codecs. In another embodiment, the codec manager 706 can manage encoding and/or decoding using hardware codecs and the codecs I and II 701 and 702 represent the interfaces to the hardware codecs.

The conditional access manager 708 is a mechanism that controls and manages the user's ability to access the IPTV content (i.e. programming content) or services provided by a network provider. In the depicted embodiment, the conditional access manager 708 interacts within one or more CA modules or mechanisms provided by one or more different vendors, as represented by CA I-IV 705-711. For example, different types of vendors may use different CA mechanisms, and CA I-IV 705-711 represent that the system can support various types of CA modules or mechanisms. In some embodiments, subscribers may opt for varying levels of service, and thus access to the content is controlled via the conditional access manager 708. Unlike physical STB that use a traditional hardware 'smart card', the embodiments described herein may use a virtual 'smart card.' Ideally such a system is managed from a single installation of the customer's CA head-end system and allows rights to be managed seamlessly over heterogeneous display devices. The CA manager 708 communicates with the host operating system 701, such as with the network and event drivers 732, to communicate keys 713 to/from the CA head-end system to control access to the IPTV content. The CA manager 708 is an easy mechanism to deliver and manage IPTV content from a network provider's prospective. Alternatively, other CA mechanisms may be used such that a service provider is able to control and manage the user's ability to access the programming content.

The CA interface 716 may be used to enable the middleware component to initiate the registration of 3$^{rd}$ party conditional access subsystems and to interact with the features provided by those vendors. The media interface 718 may be used to enable the middleware component to control the requesting, decoding, and displaying of the data streams (e.g., IPTV content). Said data streams could contain audio, video or data information. In one embodiment, the media interface 718 abstracts the middleware component from the underlying transport protocols and codecs required to display the content and simplifies them into a number of simple 'play' commands.

The DVSS component 710 determines and acquires the optimal quality programming possible based on the current position of the user's device within the network, for example, by receiving the IPTV content in one of the different protocols, for example, RSTP, IGMP, Digital Video Broadcasting (DVB), or others, such as peer-to-peer (P2P), streamlets (e.g., HTTP streamlets) described below. Fundamentally, the DVSS component 710 addresses the afore-mentioned need to relieve the viewer of the burden of deciding which underlying mechanism is required to receive the desired televisual content. The viewer is not, typically, concerned with selection between RTSP 715, IGMP 717, DVB-S/C/T 719 or others 721 (e.g., P2P, HTTP streamlets). Thus, the media interface 718 services requests from the DVSS component 710 of the vSTB environment 702, such that the viewer is able to simply select the content he or she wishes to watch, the technical aspects of the optimal delivery mechanism being handled 'behind the scenes' without user manually selecting the delivery mechanism. The DVSS component 710 has the capability to make decisions based on the network environment on how best to source and deliver the requested content. In one embodiment, this abstraction is continued with respect to both container formats and media types, being able to seamlessly decode multiple formats such as MPEG-1, MPEG-2, MPEG-4, WMV, Flash, etc. Alternatively, other components may be used to provide an IPTV system for receiving and presenting IPTV services on a user's device such that dynamic DVSS is achieved, where the system is able to determine and acquire the optimal quality programming possible based on the current position of the user's device within the network. This source selection may be achieved dynamically, without the need for explicit input from the user. Alternatively, the source selection may be achieved with some or minimal input from the user, such as the user's preference.

The events interface 720 is the primary interface existing between the network and event drivers 732 of the OS 701 for keyboard, mouse and remote control devices to pass their inputs/actions on to the middleware component within the emulated STB environment 702. The events interface 720 may communicate with the network and events drivers 732 using a Remote Control (RC) key handing interface 723 and keyboard/mouse (Kb/M) interface 725. Alternatively, the events interface 720 may interface with other user input devices.

The network interface 722 may be used to support the abstracted network delivery required by the media interface 718. The network interface 722 provides modules for supporting standard video delivery mechanisms: IGMP is provided to handle multicast IP based broadcast content, an intelligent RTSP proxy is provided to communicate in the appropriate RTSP dialect with RFC2326 based servers. HTTP and HTTPS interfaces 727 are also provided for standard Web 2.0 based communications.

The system settings interface 724 may be used to enable the operator to configure the virtual environment 702 in accordance with his or her needs and without having to make changes to the STB emulation component itself (e.g., 704-710). In one embodiment, the STB emulation system 700 can be configured, or tailored, to the viewer's (or service provider's) requirements via the use of configuration files, which store settings to enable and facilitate the management and control of the behavior of the STB emulation system 700.

The persistent storage interface 726 may be used to provide a mechanism for the middleware component executing within the emulated environment 702 to store both content and content metadata on the local system to enable such features as a personal video recorder (PVR) and 'off-line' modes to be implemented. Additionally, this may facilitate the operation of some middleware products which require this feature to cache carousel delivered electronic programming guide (EPG) metadata. Both the system setting interface 724 and the persistent storage interface 726 communicate with the disk and memory drivers 734 of the OS 701.

In one embodiment, the STB emulation system 700 is implemented in a computing device that is configured and arranged such that the OS 701 is able to execute on said computing device, and is connected to a network such that data may be received from external source(s) over the network and/or sent to external source(s) over the network. In another embodiment, the computing device is configured and arranged to include one or more hardware components such as those included in a typical personal/laptop computing system. Such hardware components may include, but not be limited to:
  i) a monitor ('screen') for displaying visual information and programming content;
  ii) speakers for presenting sounds and audio content; and
  iii) a hard drive for recording programming content and/or other data.

In one embodiment, the STB emulation system 700 provides a virtual STB application environment 702 which not only emulates the underlying hardware capabilities of a physical STB (e.g. video scaling, video positioning, chroma keying, alpha blending, UI layout, Remote Control key handling etc.), but also provides the same software environment in terms of available APIs and libraries such that $3^{rd}$ party middleware is able to execute in this environment without modification, even though the middleware was designed originally for use with a physical STB (and television set) rather than with a computing device operating the STB emulation system 700.

In another embodiment, the STB emulation system 700 provides an IPTV system for receiving and presenting IPTV services on a user's device such that DVSS is achieved, where the system is able to determine and acquire the optimal quality programming possible based on the current position of the user's device within the network. This source selection may be achieved dynamically, without the need for explicit input from the user, or alternatively, with user input.

The embodiments described herein may also provide a means of receiving and presenting said IPTV service such that $3^{rd}$ party category I or category II middleware (described below), designed for execution by a physical STB, can execute in its usual manner and provide the same functionality on the viewer's computing device without any alteration or modification, even though it was designed originally for use with a physical STB rather than a computing device. The maintained functionality will typically include the ability to perform presentation layer rendering, video blending and multi-media control, and the provisioning of UIs.

Figure 8:
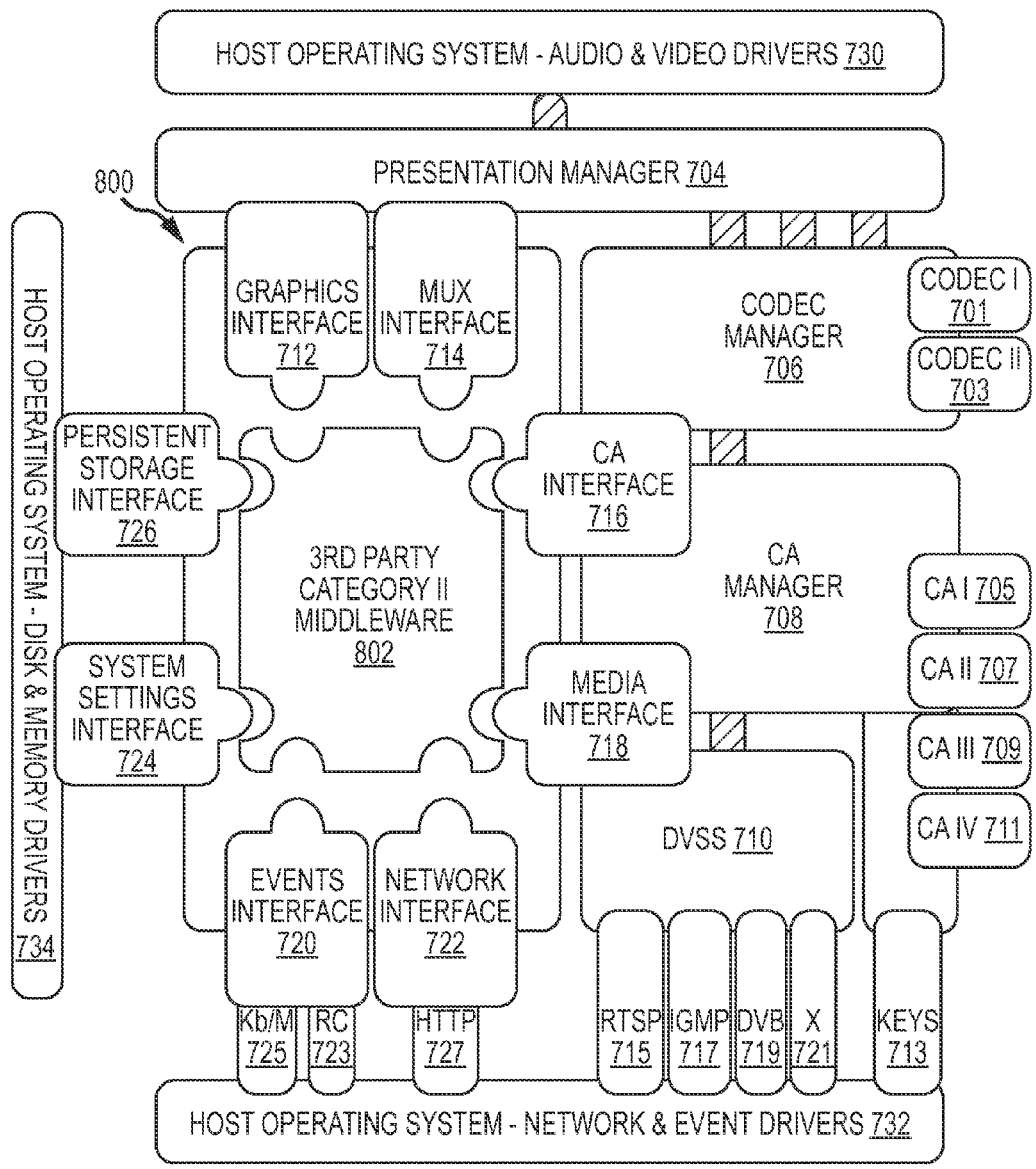
FIG. 8 shows an embodiment of an STB emulation system that is arranged and configured for use with application programming interfaces (API)-based, category II middleware.

FIG. 8 shows an embodiment of an STB emulation system 800 that is arranged and configured for use API-based, category II middleware 802. The STB emulation system 800 is similar to the STB emulation system 700 as noted by similar reference labels, except the middleware component is specifically category II middleware 802. As described above, the category II middleware 802 may be written directly on top of the low-level APIs (typically implemented in languages such as C or C++) provided by the STB vendors to control the media management elements (e.g., components 704-710) of the service and typically utilize proprietary based rendering technologies to render their user interfaces (UIs). FIG. 8 shows how the core interfaces APIs 712-726-connect directly to the APIs provided by the category II middleware 802. Thus, the category II middleware 802 is able to operate within the emulated environment 702 without any alteration or modification, even though it was designed originally for use with a physical STB rather than a computing device operating the STB emulation system 800.

Figure 9:
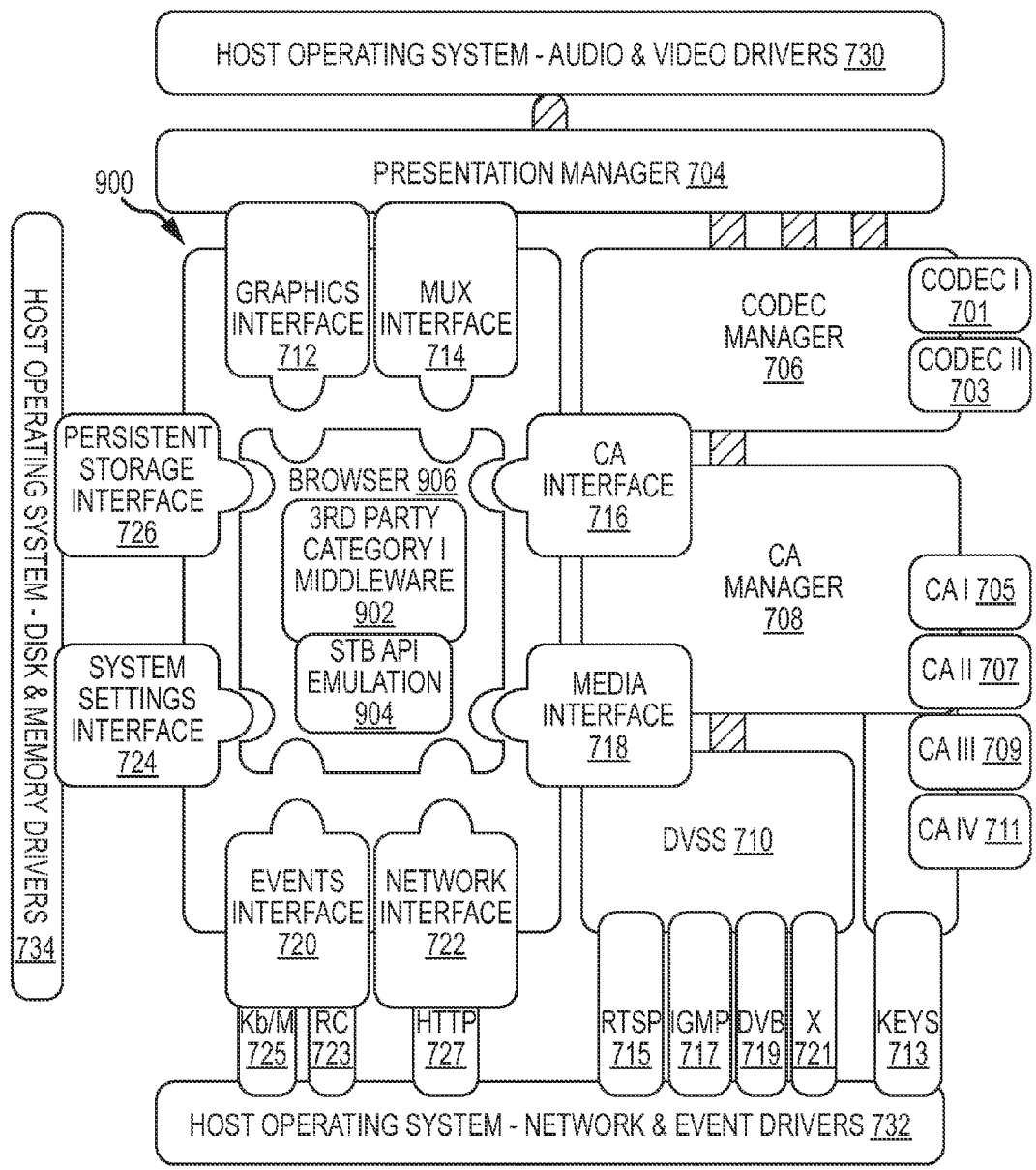
FIG. 9 shows an embodiment of an STB emulation system that is arranged and configured for use with (browser embedded) category I middleware.

FIG. 9 shows an embodiment of an STB emulation system 900 that is arranged and configured for use with browser-embedded, category I middleware. The STB emulation system 900 is similar to the STB emulation system 700 as noted by similar reference labels, except the middleware component is specifically category I middleware 902. As described above, the category I middleware 902 is embedded within the DOM of a STB's embedded browser 906, such as a proprietary web browser. The category I middleware 902 may be written in the form of scripting languages libraries (e.g., ECMAScript libraries), to control the media management elements (e.g., components 704-710) of the service and utilize standards based rendering technologies to render their user interfaces (UIs), such as HTML and SVG. FIG. 9 shows how the core interfaces (APIs) 712-726 (e.g., graphics interface, events interface, etc) connect to the embedded browser 906, or alternatively, are integrated with the embedded browser 906. In one embodiment, the category I middleware 902 connects to the browser 906 via a STB API emulation component 904. In one embodiment, the STB API emulation component 904 includes a set of STB emulation APIs (written in ECMAScript) that is inserted into the DOM of the browser 906. The set of STB emulation APIs emulate and/or replace the APIs which would traditionally be provided by the STB vendor. They take DOM requests and translate them into API requests. Thus, the category I middleware 902 is able to operate within the emulated environment 702 without any alteration or modification, even though it was designed originally for use with a physical STB rather than a computing device operating the STB emulation system 900.

Figure 10:
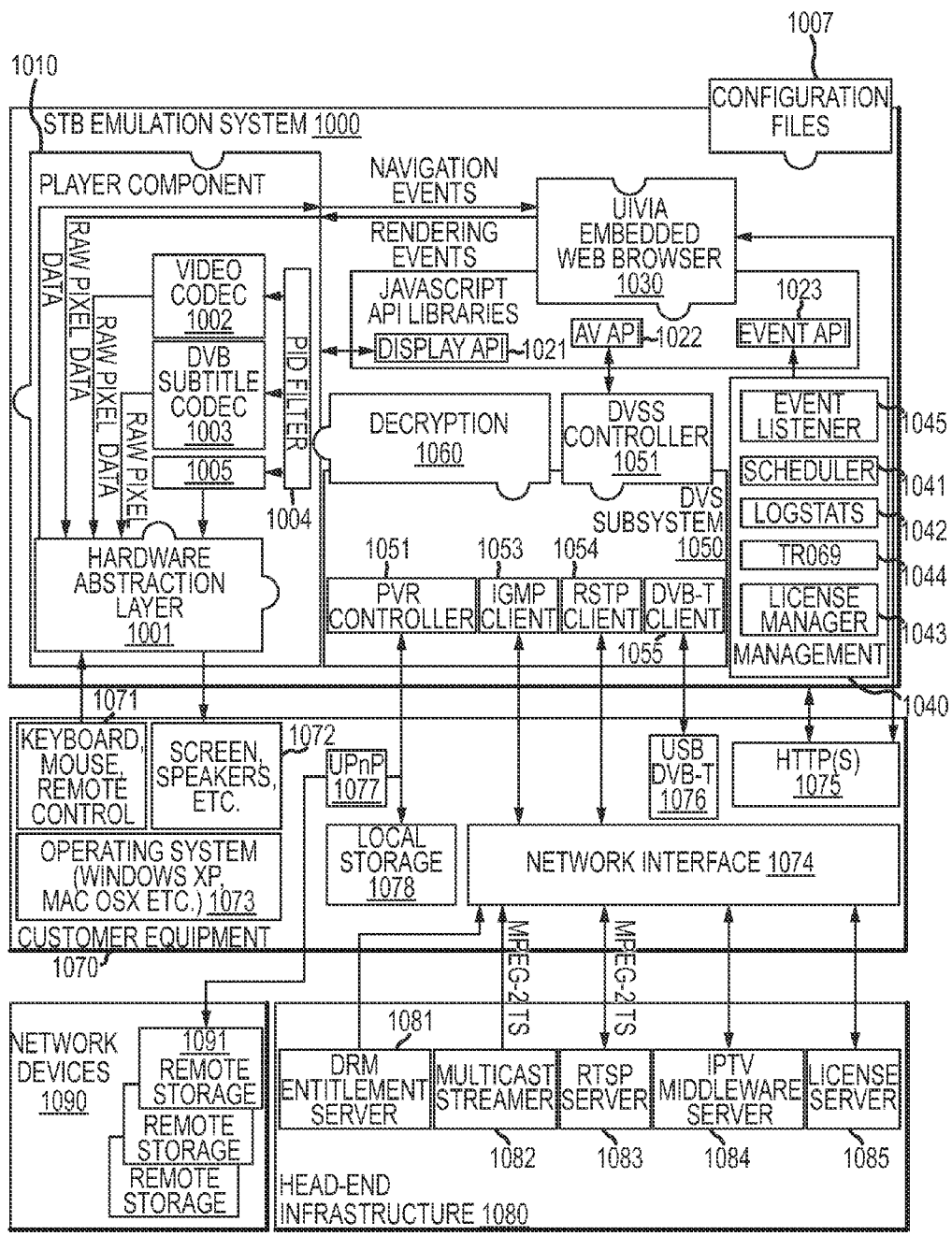
FIG. 10 shows the core components of a STB emulation system arranged to deliver IPTV content to a device for display to a viewer according to one embodiment.

FIG. 10 shows the core components of a STB emulation system arranged to deliver IPTV content to a device for display to a viewer according to one embodiment. The STB emulation system 1000 includes the following subcomponents: i) a player component 1010; ii) API libraries 1020; iii) an embedded web browser 1030; and iv) a management component 1040. In another embodiment, the STB emulation system 1000 further includes a DVSS component 1050.

In one embodiment, the player component 1010 includes one or more sub-components, such as a hardware abstraction layer 1001, a video codec component 1002, a DVB subtitle codec component 1003, a PID filter 1004, and an audio codec component 1005. These components are used to render the video, graphics, and/or text and to present the audio on the screen and speakers 1072 of the customer equipment 1070. These components can also be used to receive input from the user input devices 1071, such as keyboard, mouse, remote control, and/or the like, to report back navigational events to the embedded web browser 1030.

In one embodiment, the API libraries 1020 are implemented in a language such as Javascript, and may include a display API 1021, which provides connectivity with said player component 1010, an AV API 1022, which provides connectivity with a DVSS controller 1051, which in turn integrates with said DVSS component 1050, and an Event API 1023, which provides support for requests made by the management component 1040.

In one embodiment, embedded web browser 1030 performs the UI functionality. The embedded Javascript APIs enable the browser 1030 to integrate with various other subcomponents of the STB emulation system 1000 to control the user interface. For example, the display API 1020 may be provided so as to handle requests made via the browser 1006 and requiring action by a sub-component of the player component 1010. Similarly, the AV API 1022 and the event API 1023 may be provided so as to handle communication between the browser 1006 with the other components and sub-components of the STB emulation system 1000.

In one embodiment, the management component 1040 includes sub-components such as a scheduler 1041, a log/statistics maintenance component 1042, a license manager 1043 for handling the licensing of the STB emulation system 1000, a TR-135 client 1044 that allows the device to be managed, for example, by standards-based management servers (e.g., TR-069 based management servers), and an Event Listener 1045, which interacts with the event API 1023 provided within the Javascript API libraries 1020. In one embodiment, the management component 1040 enables a network operator to manage the STB emulation system 1000 as if it were a network device, such as a router or a physical STB. In one embodiment, the management component is used in order to deploy various components of the system to many residential viewers.

In one embodiment, the DVSS component 1050 further includes sub-components such as (but not restricted to) a PVR controller 1052, an IGMP client 1053, a RTSP client 1054, and a DVB-T client 1055. The DVSS component 1050 integrates with the DVSS controller 1051 which in turn is supported by the AV API 1022 contained within the Javascript API libraries 1020. In one embodiment, the DVSS component 1050 also integrates with a decryption component 1060, which integrates with said player component 1010. In one embodiment, the decryption component 1060 is receives signals from a dynamically selected source, decrypt said signals and pass them on to the player component 1010 for further processing and display.

Figure 14:
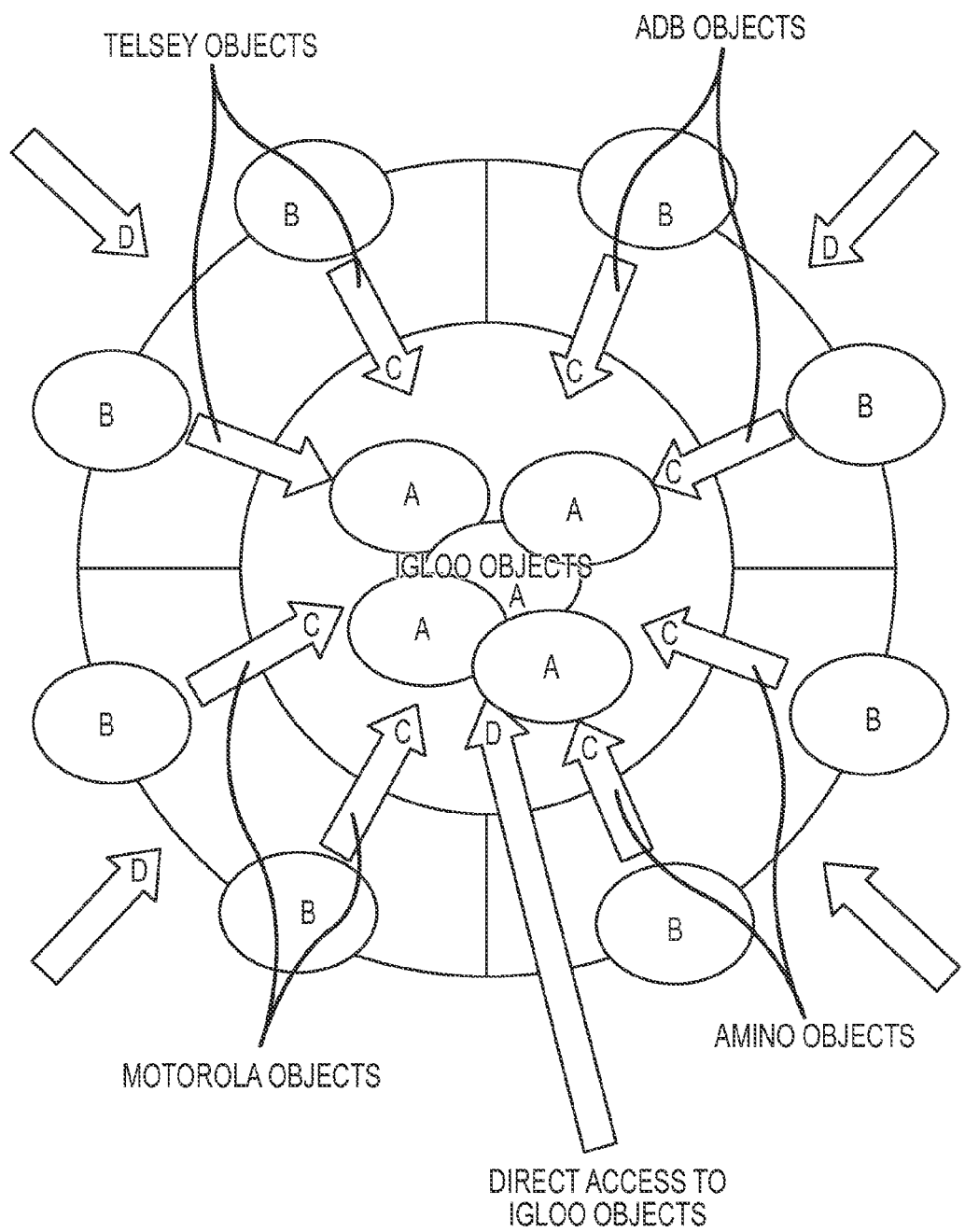
FIG. 14 is a schematic representation of the mapping of the APIs used in one embodiment of the present invention.

FIGS. 9 and 10 show a web browser (e.g. 906 or 1030) embedded within a typical embodiment such that (when using category I middleware) UI functionality may be performed via the embedded browser (e.g., proprietary browser). In one embodiment, the browser complies with the interfaces such that Category I middleware can be executed on the viewer's computing device without modification. The STB API emulation component (e.g., 904) is inserted into the DOM of the browser and accurately represents the interface corresponding to the physical STB which is being emulated. In one embodiment, this API emulation component 904 can be inserted dynamically and as such the browser is capable of emulating many standard IPTV STBs, such as illustrated in FIG. 14. The APIs themselves provide a mapping from the Javascript language directly to the underlying APIs (e.g., written in C). The DOM object is also capable of registering callback events so that events occurring within the hardware environment can be reported back to the Javascript.

In one embodiment, the STB emulation system 1000 can be configured, or tailored, to the viewer's (or service provider's) requirements via the use of configuration files 1007. The configuration files 1007 may store settings to enable and facilitate the management and control of the behavior of the STB emulation system 1000.

In the depicted embodiment, the STB emulation system 1000 interacts with components of the customer's equipment 1070. In one embodiment, the customer's equipment 1070 includes user input devices 1071, such as keyboard, mouse, remote control, and/or the like, screen and speakers 1072, an operating system 1073 (e.g., Windows-based OS, Mac-based OS, Linux-based OS, Unix-based OS, etc). The hardware of the customer's equipment 1070, such as the user input devices 1071 and screen and speakers 1072, communicate with the hardware abstraction layer 1001 of the player component 1010. The customer's equipment 1070 further includes a network interface 1074, such as a network interface card, which communicates with the head-end infrastructure 1080 (e.g., IPTV head-end system as described above). The head-end infrastructure 1080 may include a DRM entitlement server 1081, a multicast streamer 1082, a RSTP server 1023, an IPTV middleware server 1084, and a license server 1085, which each communicate with the STB emulation system 1000 via the network interface 1074. The DRM entitlement server 1081 may be responsible for authenticating the client device and for performing secure key exchanges with the client device. The multicast streamer 1082 may be the output stage of a DVB to IP Gateway. The component delivers UDP datagrams to the network which encapsulate the video date, e.g., MPEG video data. The RTSP Server1023 may be a RFC2326 compliant server controlled by the client device to achieve VoD functionality. The IPTV middleware server 1084 may be responsible for orchestrating the user experience, as well all transactional based services, such as, for example, VoD payments and Pay-Per-View (PPV) events. The license server 1085 may be responsible for version control of the deployed vSTB software. Operators can suggest upgrades to the user, force upgrades on the user, and/or revoke product use all together. The customer's equipment 1070 may also support various protocols, such as HTTP(s) 1075, which can be used to communicate with the management component 1040, USB DVB-T 1076, which can be used to communicate with the DVSS component 1050 (e.g., DVB-T client 1055), and Universal Plug and Play (UPnP) 1077, which can be configured to communicate with the DVSS component 1050 (e.g., PVR controller 1052) and other network devices 1090, such as remote storage 1091. The customer's equipment 1070 may also include local storage 1078.

As previously stated, viewers of IPTV programming content are not generally concerned with the underlying delivery mechanism(s) used to provide their viewing content. They do, however, care about the quality of that content, and the ease with which they can access their desired programs. As such, embodiments of the DVSS component 1050 may be used to present the viewer with a consistent viewing experience (e.g., consistent navigational paradigm) while, behind the scenes, determining and acquiring the best quality programming available based upon the current position of the client device within the network. The DVSS component 1050 can be used to switch between sources from which it can receive the media content, such as by receiving IPTV content using IGMP, or receiving the media content using different protocols, for example, RSTP, Digital Video Broadcasting (DVB), or others, such as peer-to-peer (P2P), or streamlets (e.g., HTTP streamlets). In another embodiment, the STB emulation system 1000 may not include the DVSS component 1050 and may communicate only through the closed network using IGMP, for example.

Using the DVSS component 1050, the STB emulation system 1000 can provide a single experience of optimal quality on any network, regardless of whether the network in which the client device is located is a multicast enabled delivery network. In one embodiment, the use of the DVSS component 1050 removes the requirement of using a closed network for delivery of the IPTV to the client device when the client device is not located within the closed network. In another embodiment, the provision of the DVSS component 1050 removes the need for a closed network, and allows the client device to receive 'regular' DVB based broadcast feeds (typically via a USB-based DVB-T dongle) and thus it is not mandatory that the video packets received via the network are encapsulated in IP.

The DVSS component 1050 may provide a consistent viewing experience, using any available network, while maintaining optimal quality of service. In one embodiment, the DVSS component 1050 can determine that the client device can receive the media content through a closed network that supports, for example, IGMP, or through an open network that supports HTTP, for example. The DVSS component 1050 can determine which delivery mechanism to use in order to provide the user with the best quality programming available. For example, the DVSS component 1050 may detect that it is located within a P2P based delivery network or a HTTP based delivery network (e.g., CDN), and the DVSS component 1050 can retrieve the media content over one of these other types of networks, instead of through the closed network. There may be other scenarios where the DVSS component 1050 detects multiple networks for delivery of the media content, and the DVSS component detects which of these sources can provide the highest quality to the viewer, regardless of the delivery protocol selected (e.g., IGMP, HTTP, or the like). It should be noted that these embodiments allow the STB emulation system 1000 to possibly retrieve the same set of channels over a different delivery mechanism when located within certain network environments.

For DVSS, the DVSS component 1050 needs to know how to determine in which network it finds itself and how to issue the appropriately formed request in order to deliver the requested media content to the viewer. The functionality of the DVSS component 1050 can be decomposed into a number of key technical areas: 1) Dynamic network awareness; and 2) Dynamic addressing and sourcing. For dynamic network awareness, the DVSS component 1050 needs to be aware of the environment in which it finds itself. In one embodiment, the DVSS component 1050 has the ability to detect the capacity of a network to deliver multicast traffic and, if so, at what bitrate. The bitrate calculation should also take into account the possibility of two (or more) devices which are attempting to source content over the same DSL line. There are a number of ways of determining the networks capability—for example, simply issuing an IGMP request which fails is sufficient to determine lack of multicast support. Having determined the network environment, dynamic addressing and sourcing implies that the metadata collected at the head-end should not multiply based on the number of delivery mechanisms available to us. In one embodiment, the DVSS component 1050 selects the appropriate URI syntax to request the media content. Selecting the appropriate URI syntax can also be done in a number of ways—for example, In one embodiment, the DVSS component 1050 uses a consistent addressing schema to request the media content from the different sources:

Multicast=igmp://192.168.357:5000
Non-multicast=move://movenetworks.com/192/168/357/today.qvt In another embodiment, a simpler approach would be to use a common identifier for the content and then allow the client to determine the appropriate delivery mechanism. For example, a channel asset is typically created for Channel1 by associating it with a URL in the form of IGMP://xxx.xxx.xxx.xxx:5000. This is unfortunate, as it strongly implies that a multicast network is available (e.g., IGMP). In another embodiment, client device can simply ignore the URL and use a unique channel name as a key to communicate with the other receives, such as P2P, DTT, or HTTP. Alternatively, other mechanisms may be used to request the content from the various sources.

In another embodiment, the DVSS component 1050 provides the ability to issue the appropriate requests independent of original URI based information; this could, perhaps, be from multicast, USB based DVB-T devices or other streaming technologies such as P2P or HTTP streamlets.

Figure 11:
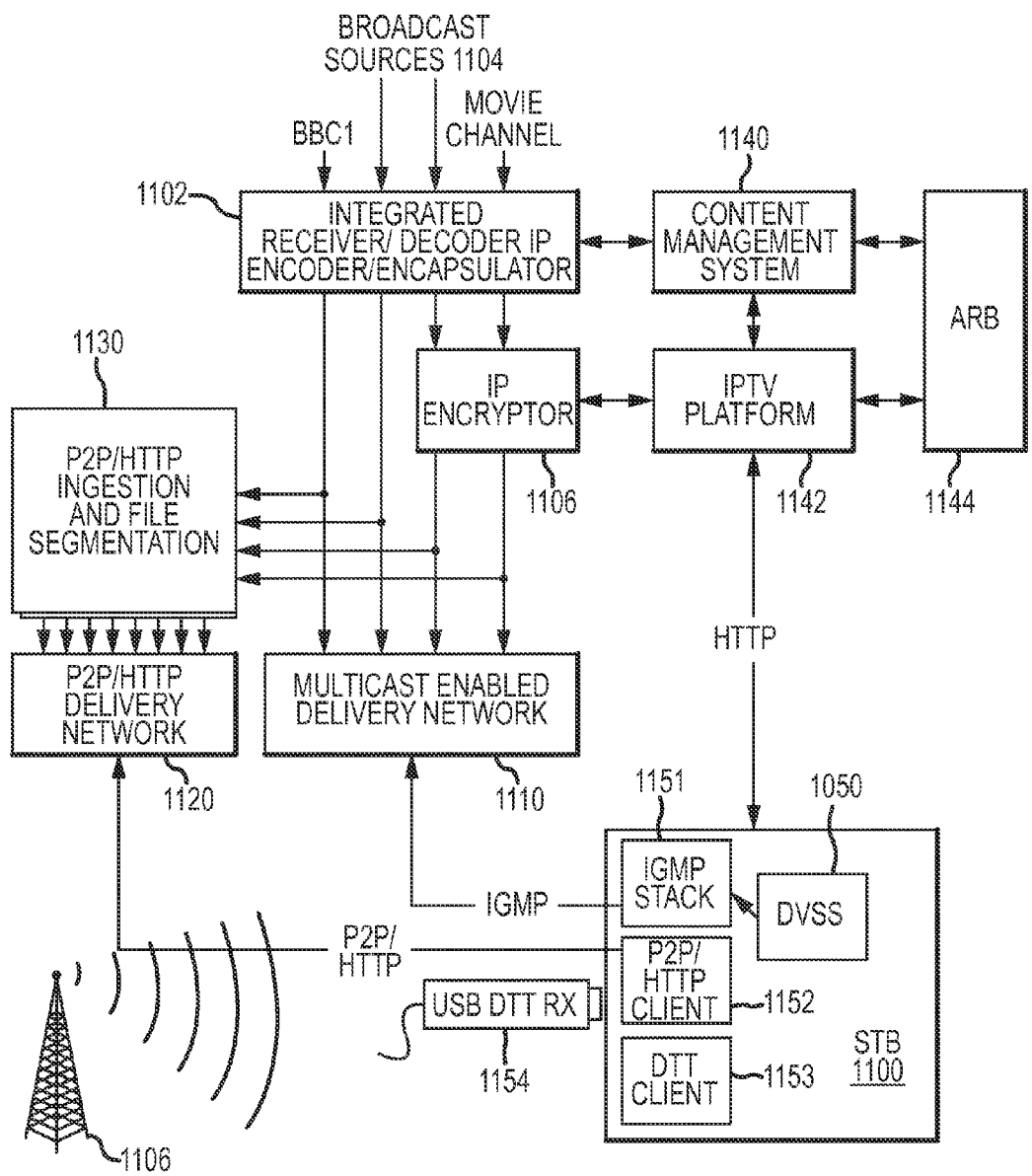
FIG. 11 shows a detailed scheme of a dynamic video source selection (DVSS) component for performing dynamic source selection according to one embodiment.

FIG. 11 shows a detailed scheme of a DVSS component for performing dynamic source selection according to one embodiment. In this embodiment, the head-end architecture includes an integrated receiver/decoder and IP encoder/encapsulator 1102, similar to those described above that receives media content from the broadcast sources 1104. The head-end architecture also includes an IP encryptor 1105 that encrypts the media content into IPTV content for delivery over the multicast enabled delivery network 1110. In this embodiment, when the DVSS component 1050 request the IPTV content over the multicast enabled delivery network 1110, the IPTV content is delivered using IGMP protocol and is received by the STB 1100 via the IGMP stack 1151. In one embodiment, the STB 1100 is a physical STB. In another embodiment, the STB 1100 is virtual STB as described herein. In this embodiment, the head-end architecture includes a P2P or HTTP ingestion and file segmentation block 1130 that receives the media content from the integrated receiver decoder and IP encoder encapsulator 1102, as well as the IPTV content from the IP encryptor 1106, for delivery of the media content over the P2P or HTTP delivery network 1120. In this embodiment, when the DVSS component 1050 requests the media content over a non-multicast enabled delivery network, such as the HTTP delivery network 1120, the media content is delivered using P2P or HTTP protocol and is received by the STB 1100 via the P2P or HTTP client 1152. It should be noted that although illustrated as the same block, the head-end architecture may include separate components for preparing and delivering of the media content via an HTTP delivery network and the P2P delivery network.

In the depicted embodiment, the STB 1100 is also configured to receive media content using a non-IPTV based delivery system (e.g., TV broadcasts over the air), such as from a broadcasting source 1106. In this embodiment, when the DVSS component 1050 receives the media content over the non-IPTV based delivery system via the DTT client. The STB 1100 receives the media content over the air using a USB-based DVB-T dongle 1154, for example. Alternatively, the STB 1100 receives the media content over the air using other mechanisms as would be appreciated by one of ordinary skill in the art having the benefit of this disclosure.

In one embodiment, when using the HTTP delivery network 1120, the STB 1100 may request the media content using the concept of streamlets. The term "streamlet," as used herein, refers to a single encoded representation of a portion of the video. Each streamlet may be an individual a portion of the media content, and may be encapsulated as an independent media object, allowing the streamlet to be cached individually and to be independently playable by a media player. In one embodiment, the individual portion is stored in a file that can be individually requested and cached, for example, using a content delivery network (CDN). Each of these individual files may be independently or individually playable, meaning the file can be played without the need of the previous or subsequent file in the media content. In one embodiment, a streamlet is a static file that can be served by a non-specialized server, instead of a specialized media server. In one embodiment, the content in a streamlet may have a predetermined length of playback time. The predetermined length of time may be in the range of between about approximately 0.1 and 5.0 seconds, for example. The content in the streamlet may have a unique time index in relation to the beginning of the content contained in the stream. Alternatively, the streamlets may be divided according to a file size, instead of a time index. The term "stream," as used herein, may refer to a collection of streamlets of the video encoded by the same video quality profile, for example, portions of the video that have been encoded at the same video bit rate. For example, the media content of a television program may be encoded according to ten different video quality profiles, one streamlet for each portion of the media content per profile. The streamlets may be stored as separate files on any one or more of the web servers, or the proxy caches, or other devices within a CDN. The separate files (e.g., streamlets) may be requested from the web server using HTTP. Using a standard protocol, such as HTTP, eliminates the need for network administrators to configure firewalls to recognize and pass through network traffic for a new, specialized protocol, such as Real Time Streaming Protocol (RTSP). Additionally, since the media player initiates the request, a web server, for example, is only required to retrieve and serve the requested streamlet, not the entire stream. The media player may also retrieve streamlets from more than one web servers. These web servers may be without specialized server-side intelligence to retrieve the requested portions. In another embodiment, the streamlets are stored as separate files on a cache server of a network infrastructure operator (e.g., an ISP), or other components of a CDN. Although some of the present embodiments describe the use of streamlets, the embodiments described herein are not limited to use in computing systems that use streamlets, but may also be implemented in other systems that use other techniques for delivering live media content over the Internet. For example, in another embodiment, the media content is stored in a single file that is divided into portions that can be cached in the CDN using HTTP range requests.

In the depicted embodiment, the head-end architecture also includes a content management system 1140, an IPTV platform 1142, and an Accounting, Rating, and Billing (ARB) system 1144. The content management system 1140 is a central repository providing the link between physical stream arriving for encoding, their abstract representation within the IPTV middleware, and their material values as defined within the billing system. The IPTV platform is a centralized middleware server responsible for the end-users viewing experience. The IPTV platform 1142 can communicate with the STB 1100 to send encryption keys, metadata, etc., using HTTP protocol. The ARB system 1144 is a system responsible for understanding what content is being purchased by which consumer at any point in time. Therefore being able to present to that user the appropriate discounted price for any item (buy one, get one free for example) and to manage all financial transactions with respect to the purchase of that item (credit card billing, direct debits and physical bill printing).

Figure 12:
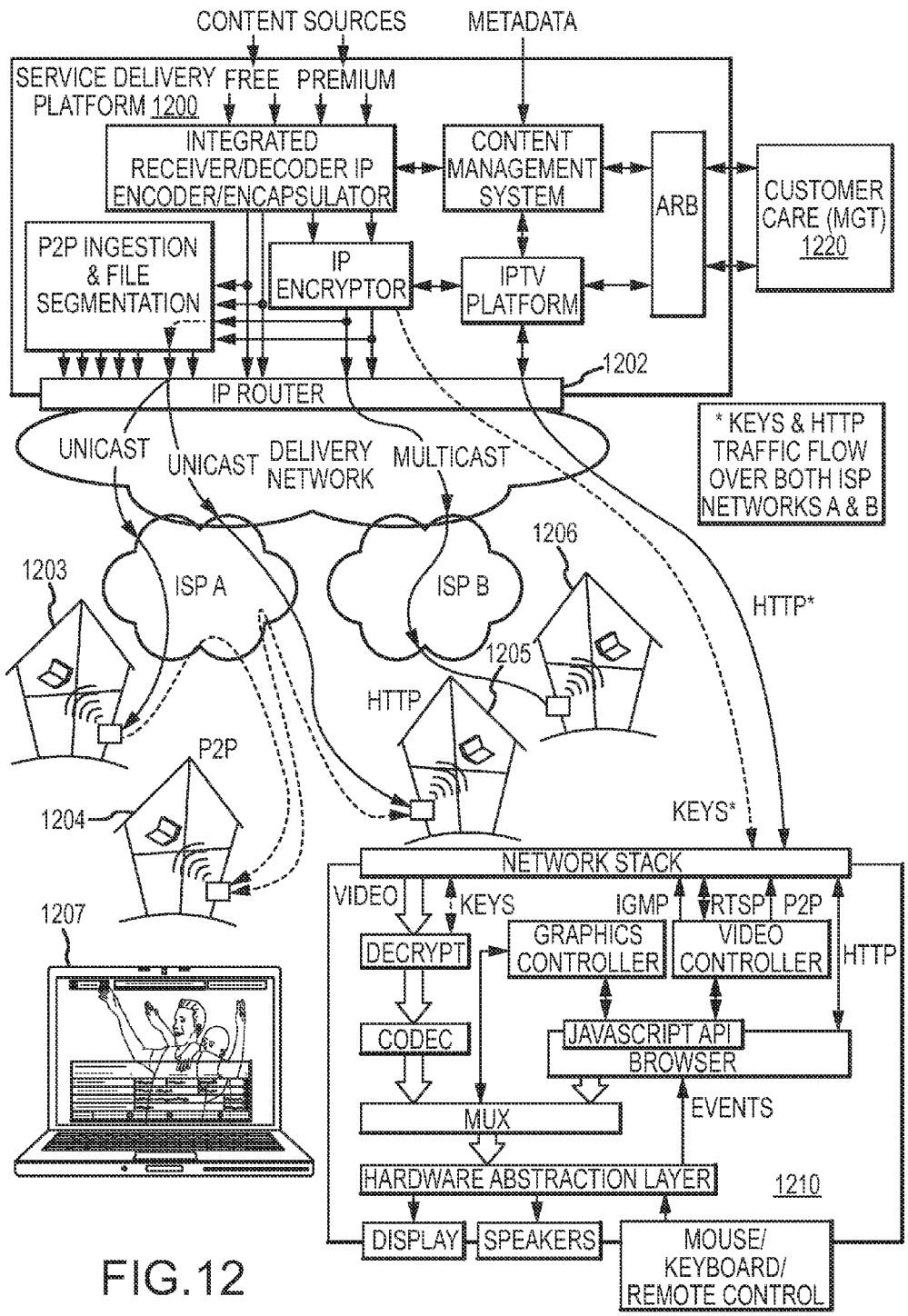
FIG. 12 shows some components of a content delivery system in accordance with one embodiment, and illustrates its ability to treat the video and UI layers independently until the point of display on the end device.

FIG. 12 shows some components of a content delivery system in accordance with one embodiment, and illustrates its ability to treat the video and UI layers independently until the point of display on the end device. In this embodiment, the service delivery platform 1200 includes various components that are described herein with respect to FIG. 11, as well as an IP router 1202 that interfaces with the delivery networks. The delivery networks may include the Internet Service Providers A and B for delivery to the client devices 1203-1206 in various locations. For example, in one instance of the ISP A, the client devices 1203-1205 operate in a P2P configuration, and in another instance, one of the client devices 1205 operates to receive the media content using HTTP. In another instance of ISP B, the client device 1206 operates in a multicast enabled network and receives the IPTV content through a closed network via ISP B.

In the depicted embodiment, the client device 1207 represents anyone of the client device 1203-1206, and includes the STB emulation system 1210. In another embodiment, the DVSS component 1050 may be integrated into a physical STB.

The STB emulation system 1210 includes a network stack that receives the network traffic, including encryption keys, IPTV content (e.g., IGMP) received through the multicast enabled delivery network, or the media content received through a unicast enabled delivery network, such as using RTSP, HTTP, P2P, or the like. The decryptor receives the video from the network stack and decrypts the media content and sends it to the codec. The network stack also receives the graphics and or text for the UI, for example, from the IP platform, such as graphics and/or text for the electronic programming guide, closed captioning text, etc. The browser application interfaces with the graphics controller and the video controller via Javascript APIs. The mux handles the UI and video mixing capabilities, as described herein, and communicates with the hardware abstraction layer to present the video on the display, play any audio on the speakers of the client device 1207. The hardware abstraction layer also receives navigational events from the mouse, keyboard, or remote control. These events are communicated to the browser application.

In the depicted embodiment, the service delivery platform 1200 is coupled to the customer care management 1220. The customer care management 1220 mayh be a third-party management tool, typically the network operators, that provides a management view of the complete television subsystem. This allows the third party to manage the service (with respect to consumer provisioning, suspension, cessation and all other forms of operational queries) from their own call centers.

Figure 13:
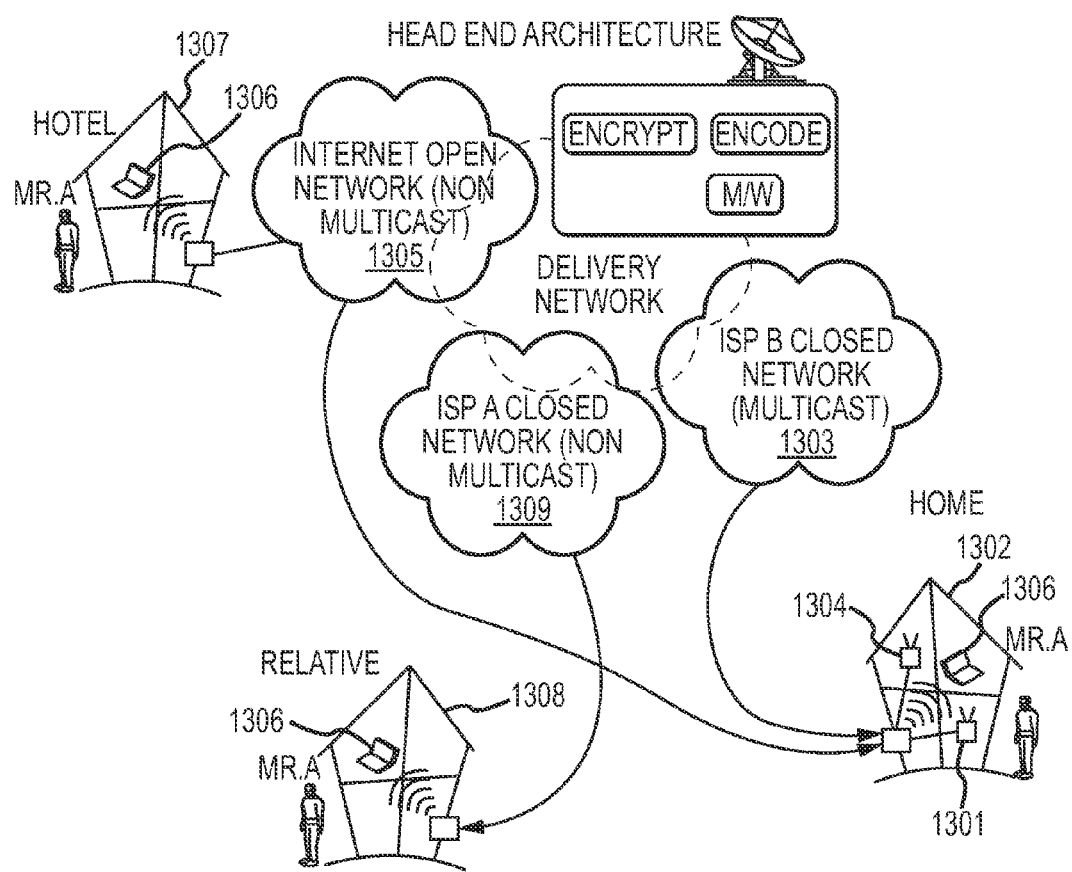
FIG. 13 illustrates a simplified diagram of how a viewer can have a consistent viewing experience in multiple network environments according to one embodiment.

FIG. 13 illustrates a simplified diagram of how a viewer can have a consistent viewing experience in multiple network environments according to one embodiment. In this embodiment, the viewer, Mr. A. takes out a subscription for a physical STB 1301 based TV service at home 1302. Mr. A's ISP B 1303 is multicast capable and as such when he presses '1' on his remote to tune to a channel (e.g., BBC 1) the physical STB interprets this request and issues an IGMP request for the media content for that channel, BBC 1.

In another embodiment, Mr. A purchases an additional physical STB 1304 and subscription for his home 1302. When Mr. A selects '1' on his new remote for BBC 1, this time the physical STB 1304 issues the IGMP request for BBC 1. However, his ISP 1303 may or may not support multiple streams for a single residence. If the ISP 1303 does support multiple streams to Mr. A's home 1302 (for example, if two STBs are operating at the same time), the IGMP request will succeed. If not the physical STB 1304, which include the DVSS component 1050 described herein, will re-issue a request for the media corresponding to BBC 1 from a non-multicast enabled network 1305, such as an open network like the Internet. In one embodiment, the physical STB 1304 requests a HTTP streamlet from a CDN or from a content server over the open network 1305 (e.g., HTTP enabled delivery network). The end result is that Mr. A gets BBC 1 even though it may now be through a completely different delivery mechanism and/or using different delivery protocol.

In another embodiment, Mr. A purchases a PC extension to his subscription. Mr. A selects BBC 1 on the laptop 1306, and the vSTB (STB emulation system 1000 as described above) issues the IGMP request for BBC 1. Mr. A's ISP 1303 may or may not support multiple streams. If the ISP 1303 does support multiple streams to Mr. A's home 1302 (for example, if another STB is operating at the same time as the vSTB), the IGMP request will succeed. If not, the vSTB will re-issue a request for the media corresponding to BBC 1 from a non-multicast enabled network 1305, such as an open network like the Internet. In one embodiment, the vSTB requests a HTTP streamlet from a CDN of the open network 1305, or from a content server over the open network 1305 (e.g., HTTP enabled delivery network). The end result is that Mr. A gets BBC 1 even though it may now be through a completely different delivery mechanism and/or using different delivery protocol.

In another embodiment, Mr. A Purchases a Roaming capability for his PC subscription and visits a hotel 1307 on a business trip. Mr. A selects BBC 1 on the laptop 1306, and the vSTB on his laptop 1306 issues the IGMP request for BBC 1. Since Mr. A is connected to the open network 1305, which does not support multicast streams, the vSTB issues a request for the media corresponding to BBC 1 from the non-multicast enabled network 1305. In one embodiment, the vSTB requests a HTTP streamlet from a CDN of the open network 1305 or from a content server over the open network 1305 (e.g., HTTP enabled delivery network). Similarly, Mr. A may visit a relative's house 1308 that has an ISP 1309, which is a closed network that does not support multicast. Mr. A. selects BBC 1 on the laptop 1306, and the vSTB on this laptop 1306 issues the IGMP request for BBC 1 from the non-multicast enabled network 1309 (ISP A). Since Mr. A is connected to the closed network 1309, which does not support multicast streams, the vSTB issues a request for the media corresponding to BBC 1 from the non-multicast enabled network 1309. The end result is that Mr. A gets BBC 1 even though it may now be through a completely different delivery mechanism and/or using different delivery protocol.

With reference to FIG. 14, one feature that makes the vSTB of the present embodiments immediately valuable to third party developers is its ability to provide an emulated API for a number of existing hardware-based STBs, such as the Amino Aminet110. The API of the STB emulation system is wrapped in a number of "pure Javascript emulations" that present the API of the native physical STB, while mapping the calls through to the applications executing in the STB emulation system, indicated as igloo objects (A). In FIG. 14, the oval objects (labeled A) represent the proprietary 'vanilla' APIs of the STB emulation system; the ellipses (labeled B) represent the emulated set top box specific APIs (these APIs match the API of the specific set top box, but map calls to the igloo APIs of the STB emulation system); the arrows (labeled C) represent the mapping of the set box specific APIs to the igloo APIs of the STB emulation system; and the arrows (labeled D) represent the IPTV middleware communicating with the emulated set top box specific APIs. It should be noted that middleware can be authored either by writing directly to the proprietary 'vanilla' API or to the abstracted STB specific APIs according to various embodiments.

Due to the limitations imposed by the Cross Platform Component Object Model (XPCOM) with respect to model overloading, default method parameters and additional cross-browser incompatibility issues, a technique of injecting the API directly into the web page as it is loaded has been implemented. This achieves the same goal of transparency to the user of the APIs and maintains the ability to use good object orientated principles as well as being browser agnostic.

One of the main functions of the vSTB in one embodiment is the switching between media streams. This stream switching can be in response to a user input, for example requesting a change from one channel of TV programs to another or the selection of a new stream by the virtual set top box from a selection of multiple sources and delivery mechanisms streaming the same content. In one embodiment, the three main components involved in media stream switching are the main container application (labeled as CProgrammeSource), the UI component encapsulated by the embedded browser (labeled as ClnukBrowser), and a number of protocol specific stream handlers, in this instance the multicast specific handler (labeled as ClgmpController).

The embedded browser abstracts an underlying browser implementation, such as, for example, WebKit or Mozilla. The ClnukBrowser is a global object initialized in main( ) in igloo.cpp. ClnukBrowser creates the browser window using Mozlib and receives mouse and keyboard events from the Simple DirectMedia Layer (SDL) and passes them on to the browser window. It also receives events from the Javascript client and sends back responses via a registered listener.

The CProgrammeSource is a global object in igloo.cpp which acts as a container for assorted video sources including those coming from a personal video recorder (PVR) or multicasts. CProgrammeSource allows the joining of a channel by URL and it encapsulates the modes that a channel can be in (for example off-air, encrypted, from a PVR, a multicast, a video on demand (VOD), and DVSS. In this instance, the DVSS component invoked during the PlayChannel(url) call has determined that the client device is in a multicast capable environment and as such elects to utilize the underlying multicast stream handler, ClgmpController. The CProgrammeSource creates a transport stream plaza, a multicast buffer and a multicast socket. It creates a table parsing thread on joining a channel and stops that thread on leaving. The CProgrammeSource holds the frame rate that is set from CodecLibAv/ CH264Codec and read by various components although not may not be used itself in CProgrammeSource. It also holds an offAirTimeout which detects channel loss based on packet delivery anomalies. CProgrammeSource also creates a CVideoController which is sub-classed depending on the source type, for example file, IGMP, RTSP, HTTP, etc.

The CIgmpController implements the CVideoController for IGMP streams. On connection it uses an injecting multicast socket to join a multicast group. It creates a receive thread and injects the multicast buffer and connected socket. The thread receives data from the socket, splits it into Digital Video Processor (DVP) packets and puts each packet into the multicast buffer. On a stop command, the socket disconnects from the multicast group.

Figure 15:
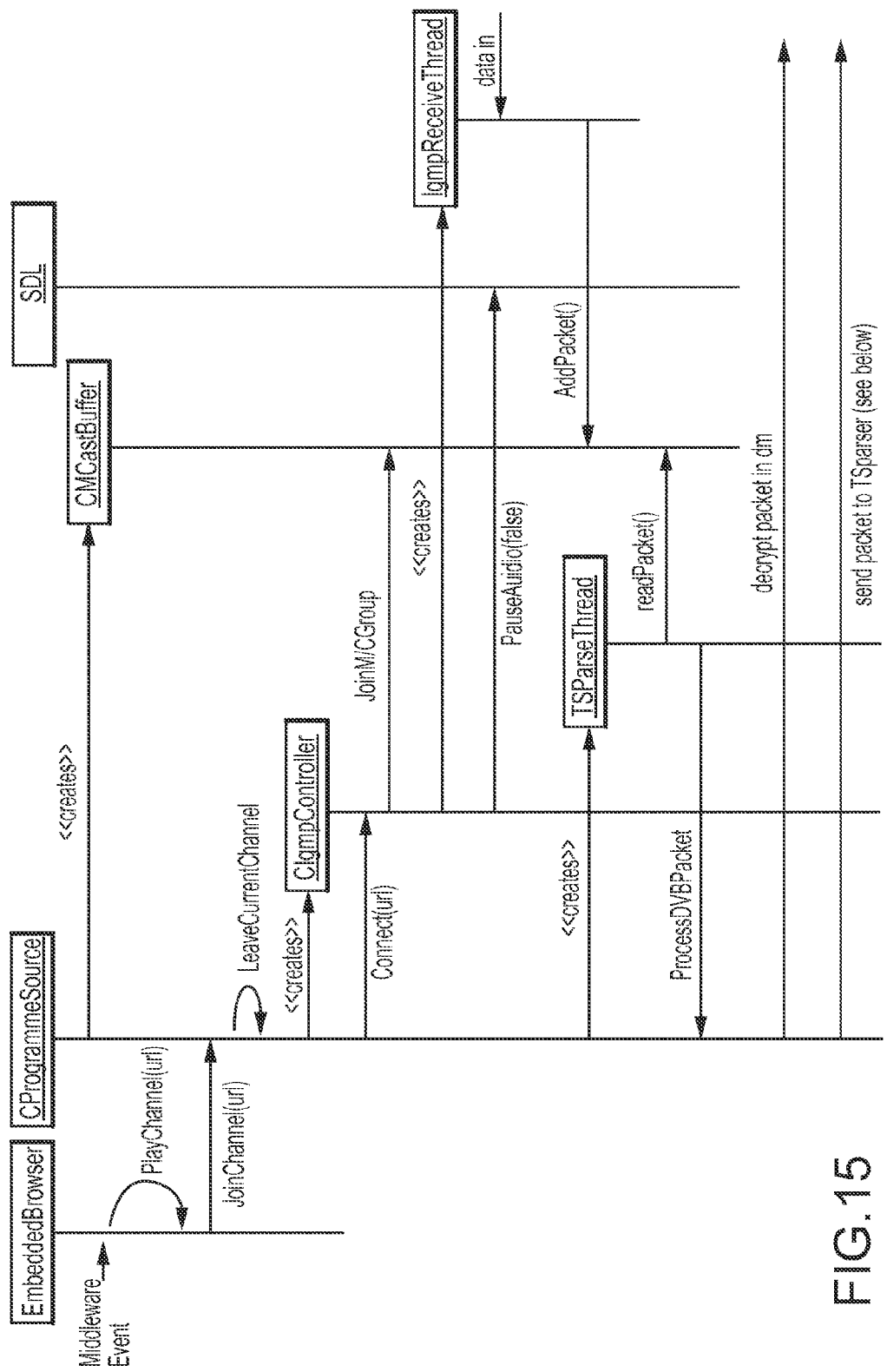
FIG. 15 is a sequence diagram illustrating a media switching process embodying part of embodiments of the present invention.
Figure 16:
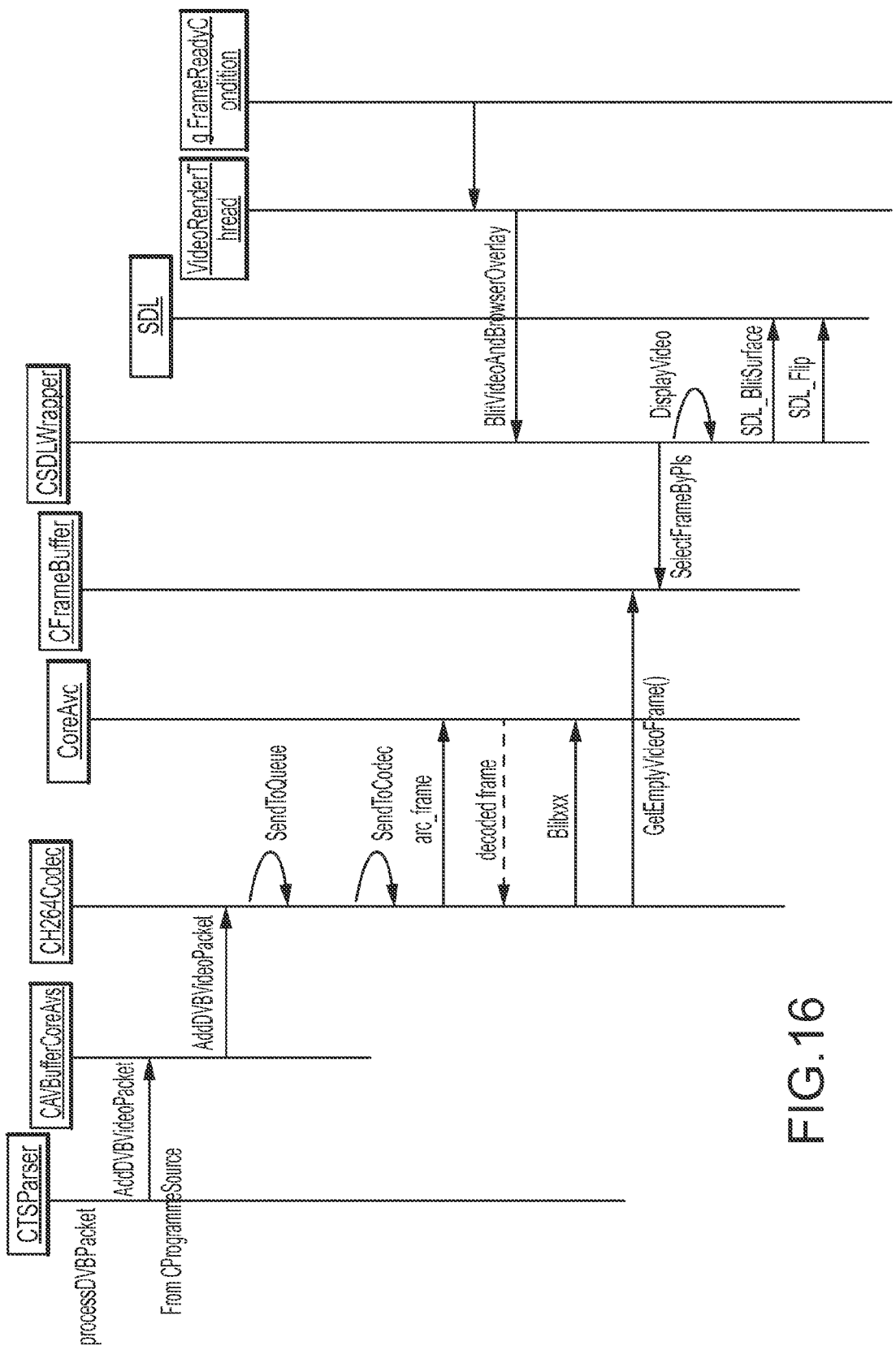
FIG. 16 is a sequence diagram illustrating the post media stream switch process according to one embodiment.

The sequence diagram shown in FIG. 15 illustrates the operation of the above components in the media switching process. Referring to FIG. 16, this sequence diagram illustrates the process occurring once a media stream switch has occurred, showing what happens to an h.264 video packet when it is received in the transport stream.

Figure 17:
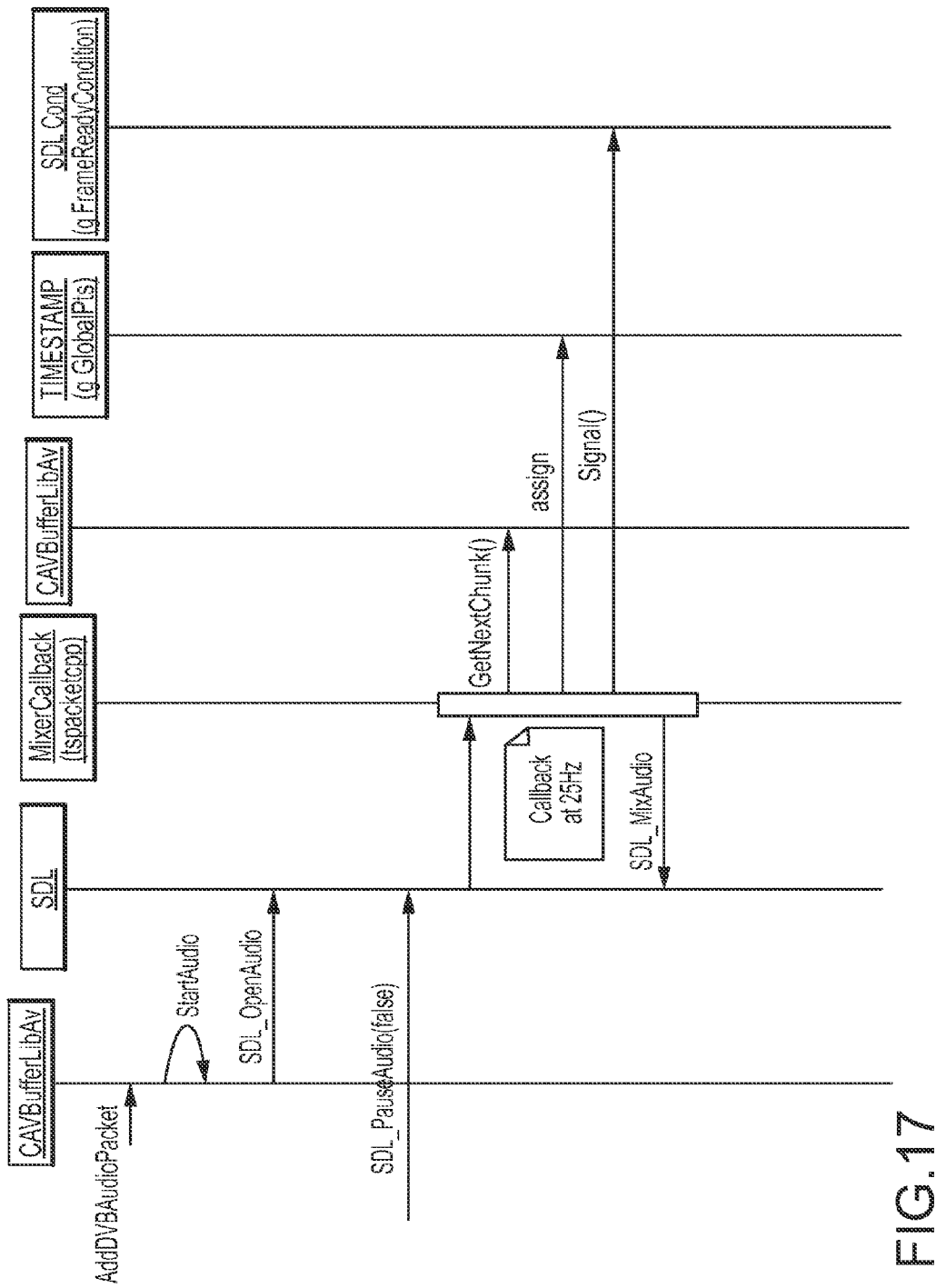
FIG. 17 is a sequence diagram illustrating the synchronizing of audio and video data in one embodiment.

Referring to FIG. 17, this sequence diagram illustrates the process of synchronizing the audio and video data received using an audio call-back mechanism that allows the video rate to be determined by the audio frequency. With the ability to switch between media sources and to synchronize the playback of audio and video components of the streams already programmed into the software of STB, it is then necessary to provide an interface through which third party applications can take advantage of these features using an application programming interface (API) of the STB.

Figure 18:
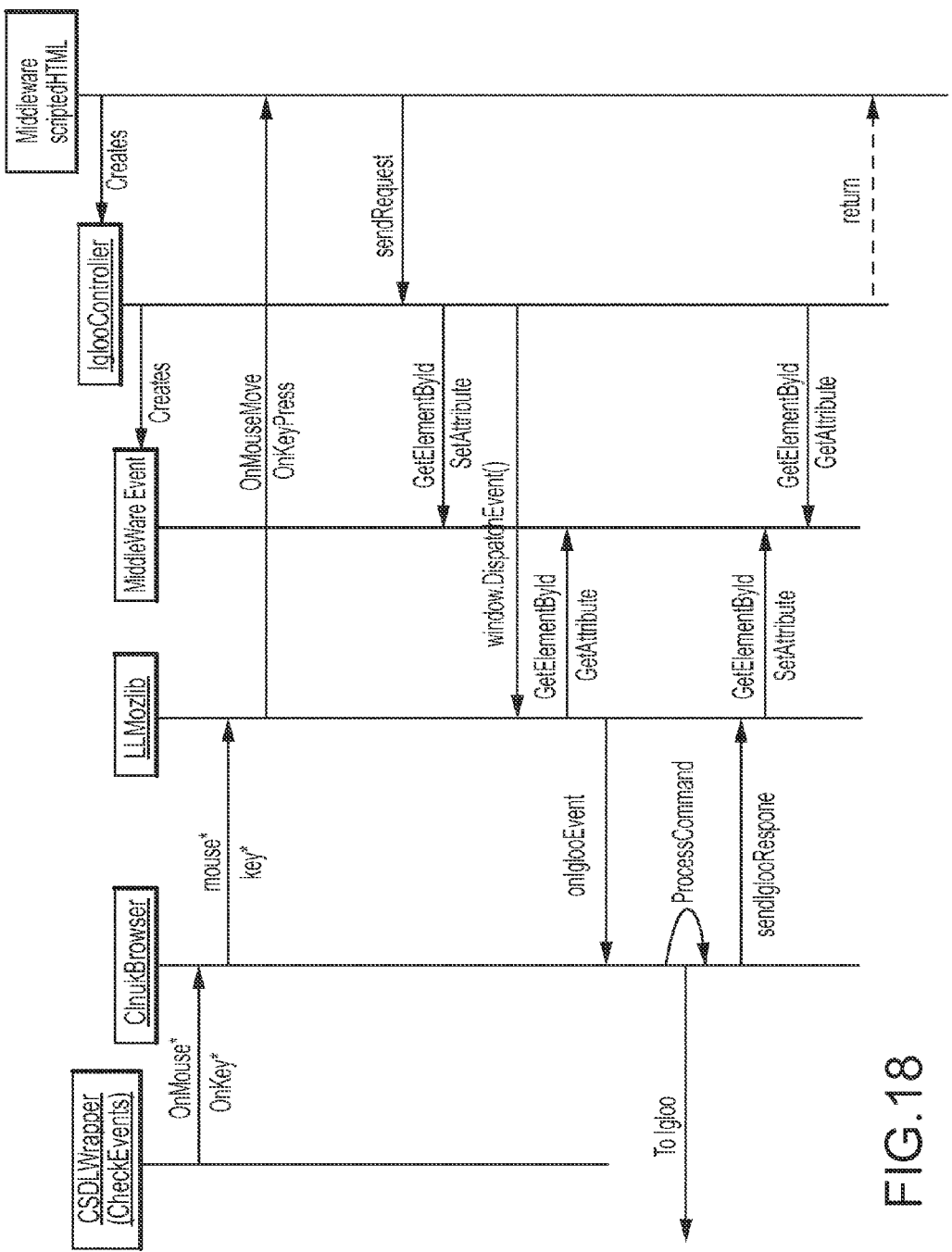
FIG. 18 is a sequence diagram illustrating the communication mechanism of the APIs with the other applications that form embodiments of the present invention.

When producing a new virtual set top box, a developer uses the API of the STB to feed the incoming data stream to the middleware and receives output signal from the middleware which is then used to produce the output display to the user on the display device. The APIs are presented to the developer through the DOM document object model (DOM) of the embedded Mozilla based browser. Communication is achieved through a combination of events and manipulation of the HTML DOM as follows. When the browser based application (the middleware) loads, the browser creates an object called IglooController which inserts an element, referred to as <iglooEvent>into the head of the HTML document. The <iglooEvent> element has two string fields, a request field and a response field. When the middleware needs to issue a command to the virtual set top box it locates the <iglooEvent> element and sets the request field. The controller then generates an iglooEvent event and dispatches it. LLMozlib is a listener that receives the event. On receipt, the LLMozlib locates the <iglooEvent> element and examines the contents of the request attribute. LLMozlib then calls the on IglooEvent on all registered LLEmbeddedBrowserWindowObservers to which the ClnukBrowser is a child of. The browser passes the command stream to processCommand. If igloo needs to pass a response back it calls sendIglooResponse in LLMozlib which set the response attribute of the <iglooEvent> element. Meanwhile the IglooController has been waiting in a spinlock for something to set the response attribute. Once this response attribute has been set the IglooController reads it, sets the contents to "" and returns to its caller. The sequence diagram of FIG. 18 illustrates this process.

The architecture of the vSTB of one embodiment is specifically designed to be platform independent and to take advantage of any native hardware acceleration where this is available. This is achieved using the abstraction layer which provides a common interface to hardware platforms specific features. This interface is an abstraction of the specific implementation details of each hardware platform that the applications of the present invention run on. This application layer is important for a number of reasons and has the significant advantage that the applications can run on a new platform by simply writing a new abstraction layer without changing the application code. It also provides a logical separation between the platform specific code and the code of the applications of the present invention making the process of maintenance of this code more straightforward. The initial platform abstraction is implemented using the Simple DirectMedia Layer (SDL) foundation library and additional interfaces that call the operating system functions directly. While SDL provides a basic platform independent interface capability for various hardware platforms it cannot effectively handle all hardware specific accelerations, for example, graphical blitting operations. Such operations, particularly where images are stretched and resized, are computationally expensive and therefore require acceleration. In one embodiment, the STB emulation system independently implements hardware acceleration by means of MMX specialized registers and as a result a significantly decreased use of the CPU.

Figure 19:
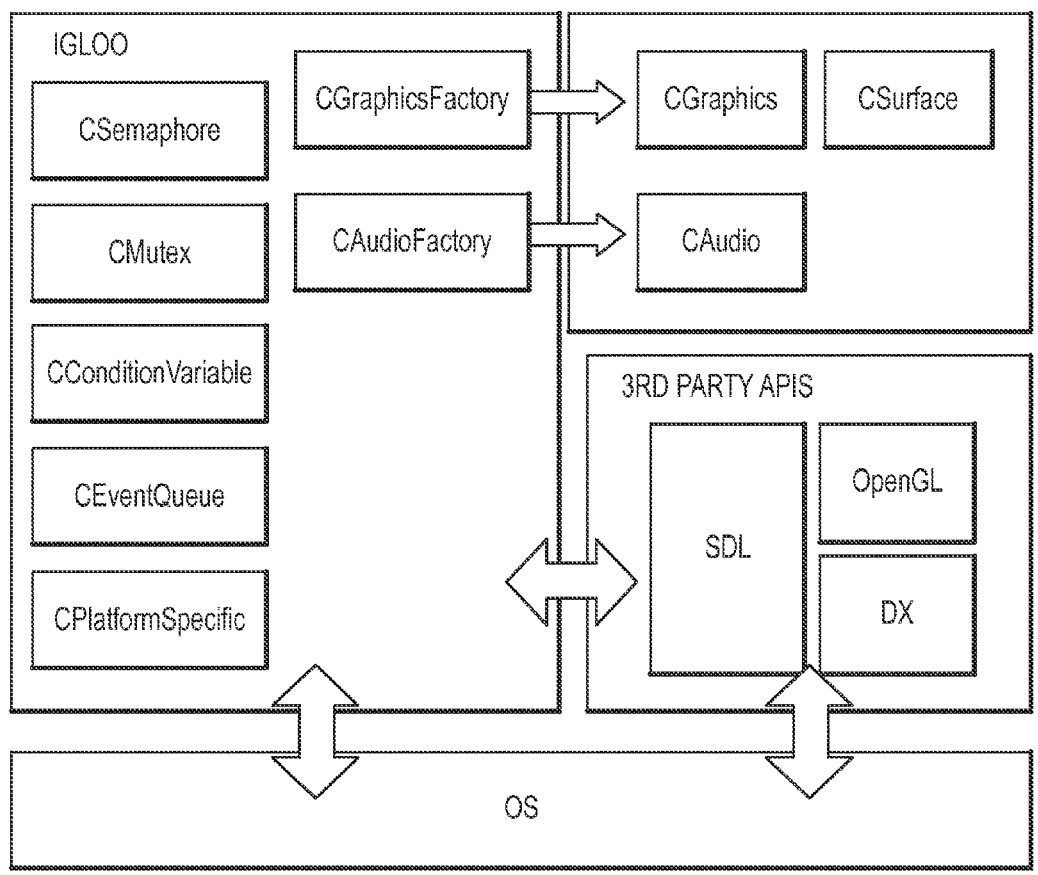
FIG. 19 is a schematic representation of the relationships between the operating system, third party APIs and embodiments of the present invention.

The abstraction layer consists of a number of components that provide interfaces to the threading, timing, event handling, graphics and audio subsystems. FIG. 19 illustrates how the abstraction layer used in the present invention relates to the third party APIs such as SDL, DirectX and OpenGL and also to the operating system. The graphics and audio interfaces are created during the run time using the CGraphicsFactory and CAudioFactory classes. Alternatively, these can be implemented using plug-ins.

Figure 20:
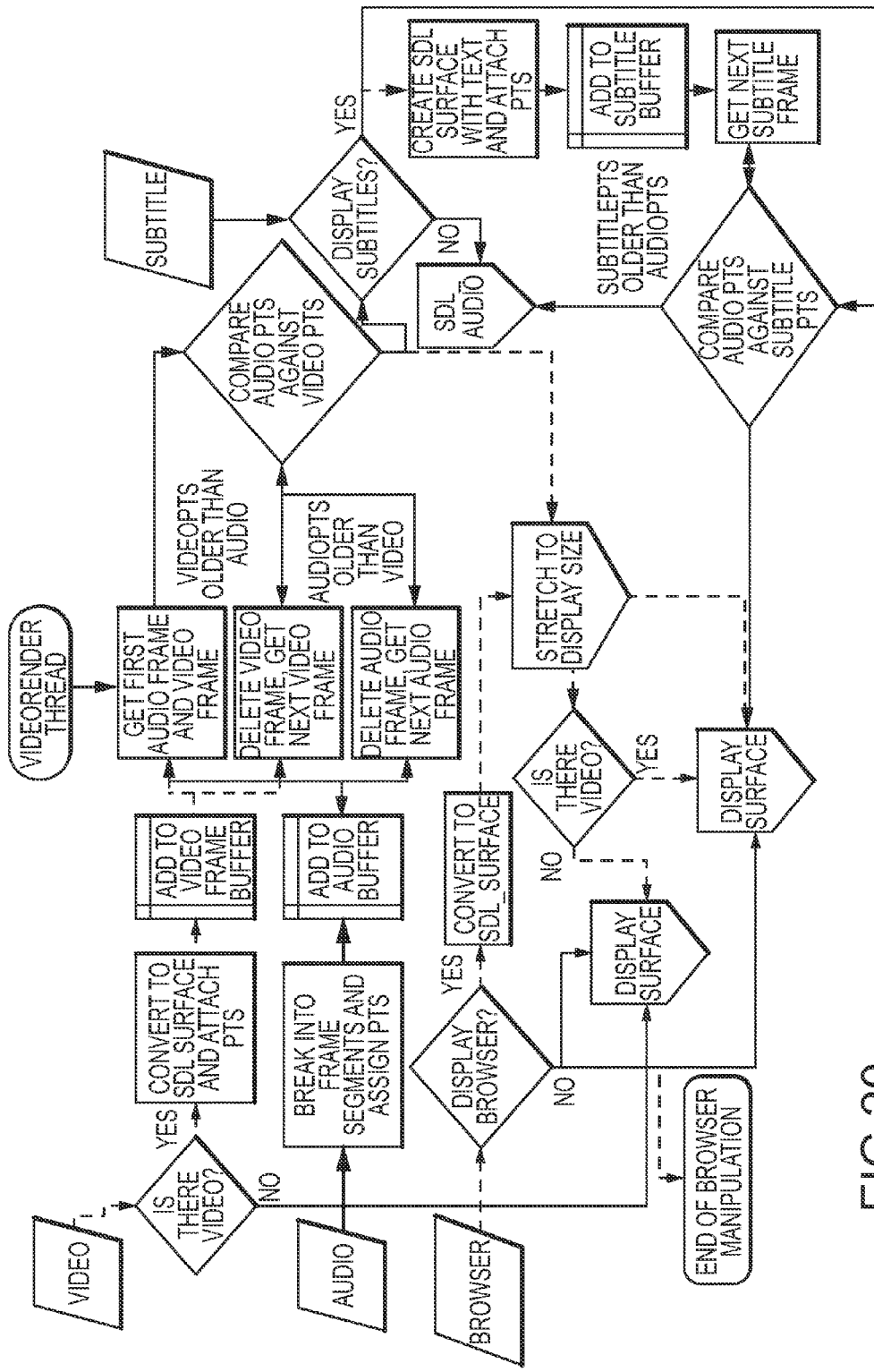
FIG. 20 is a flow diagram illustrating the operation of the abstraction rendering subsystems according to one embodiment.

The abstraction and rendering subsystems are illustrated in FIG. 20 and the remainder of components is then implemented in a platform agnostic manner operating above the hardware abstraction layer.

Figure 21:
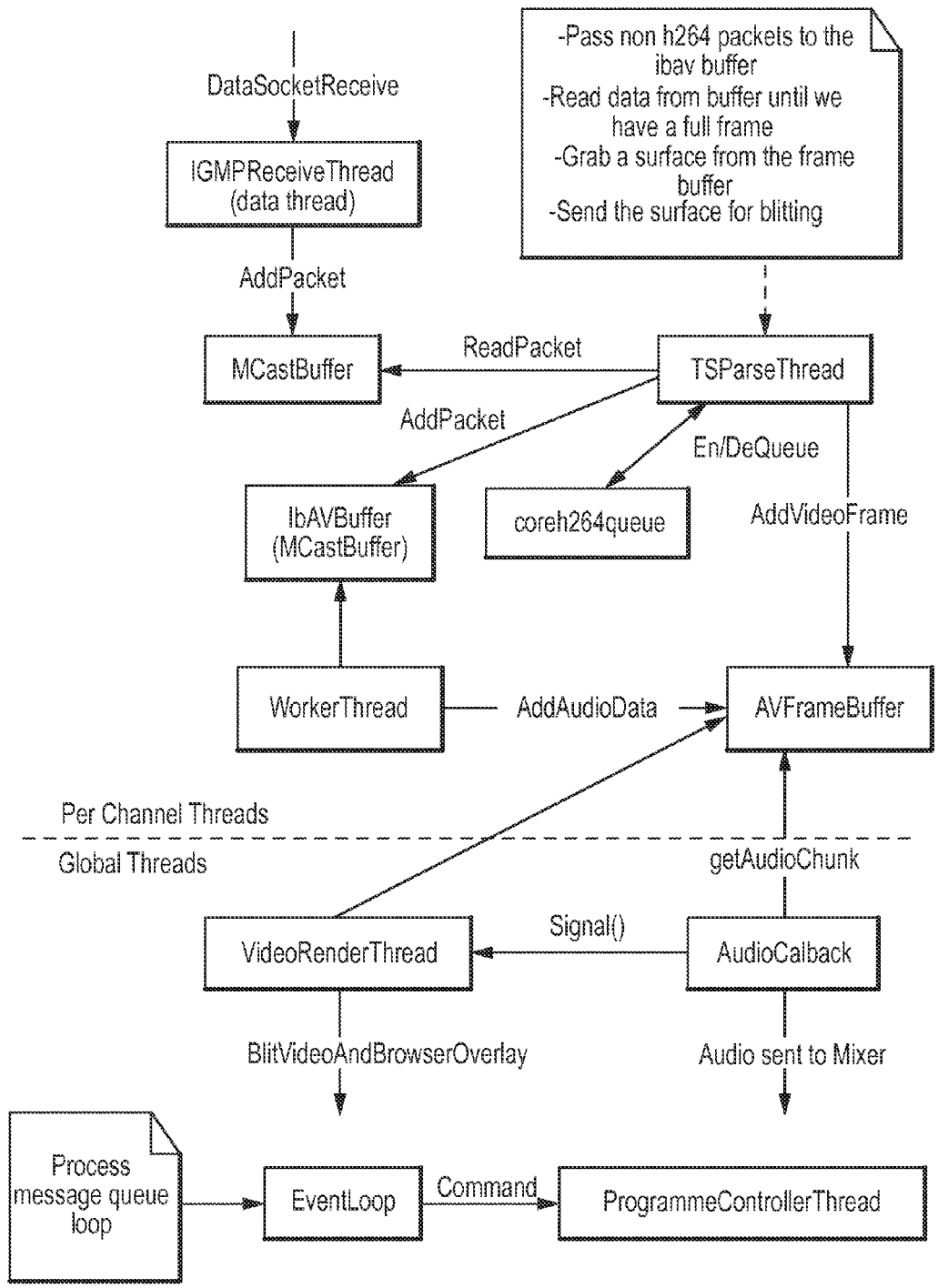
FIG. 21 is a schematic representation of the thread pulls used to illustrate an embodiment.
Figure 22:
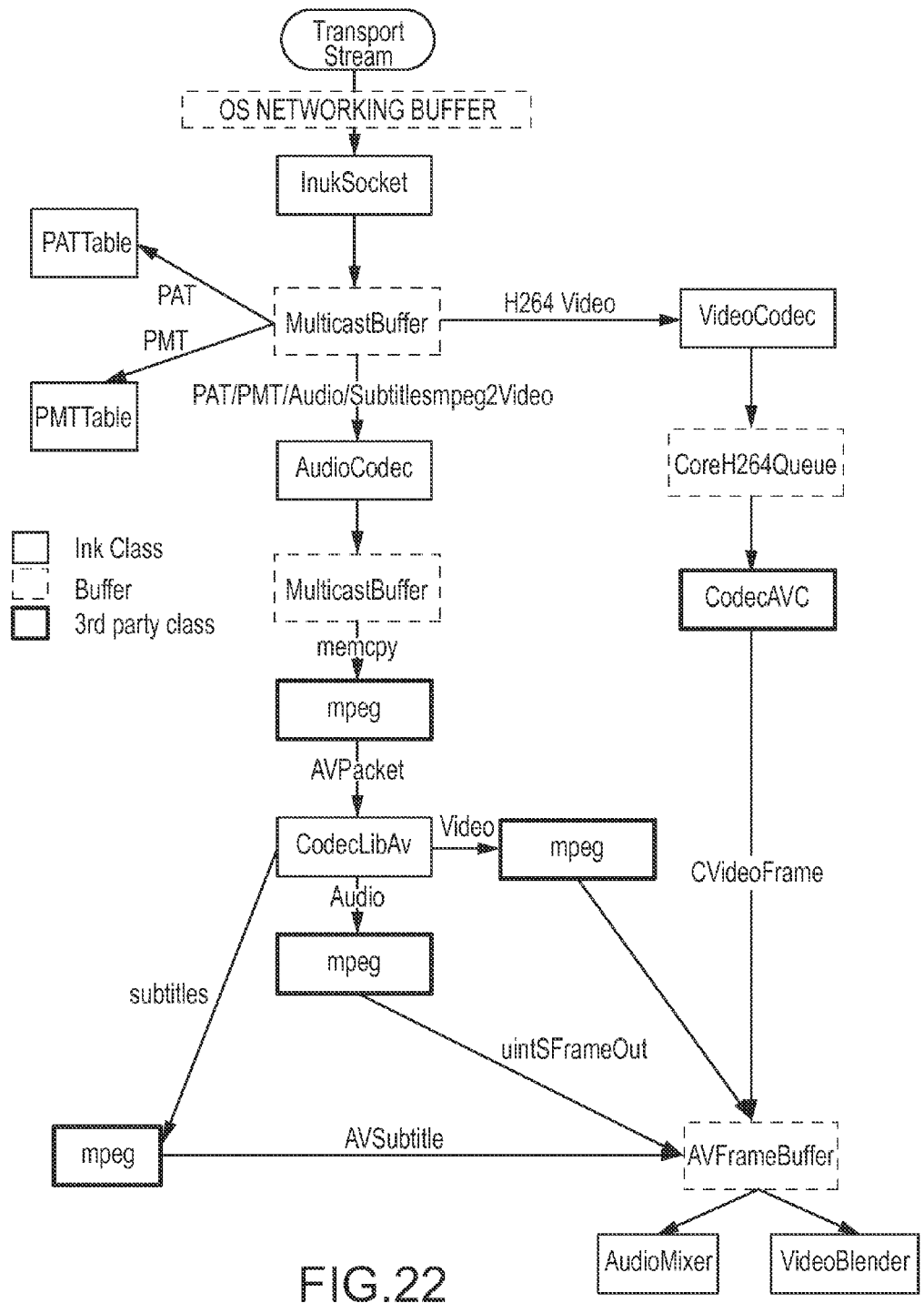
FIG. 22 is a flow diagram illustrating raw data flows in one embodiment.
Figure 23:
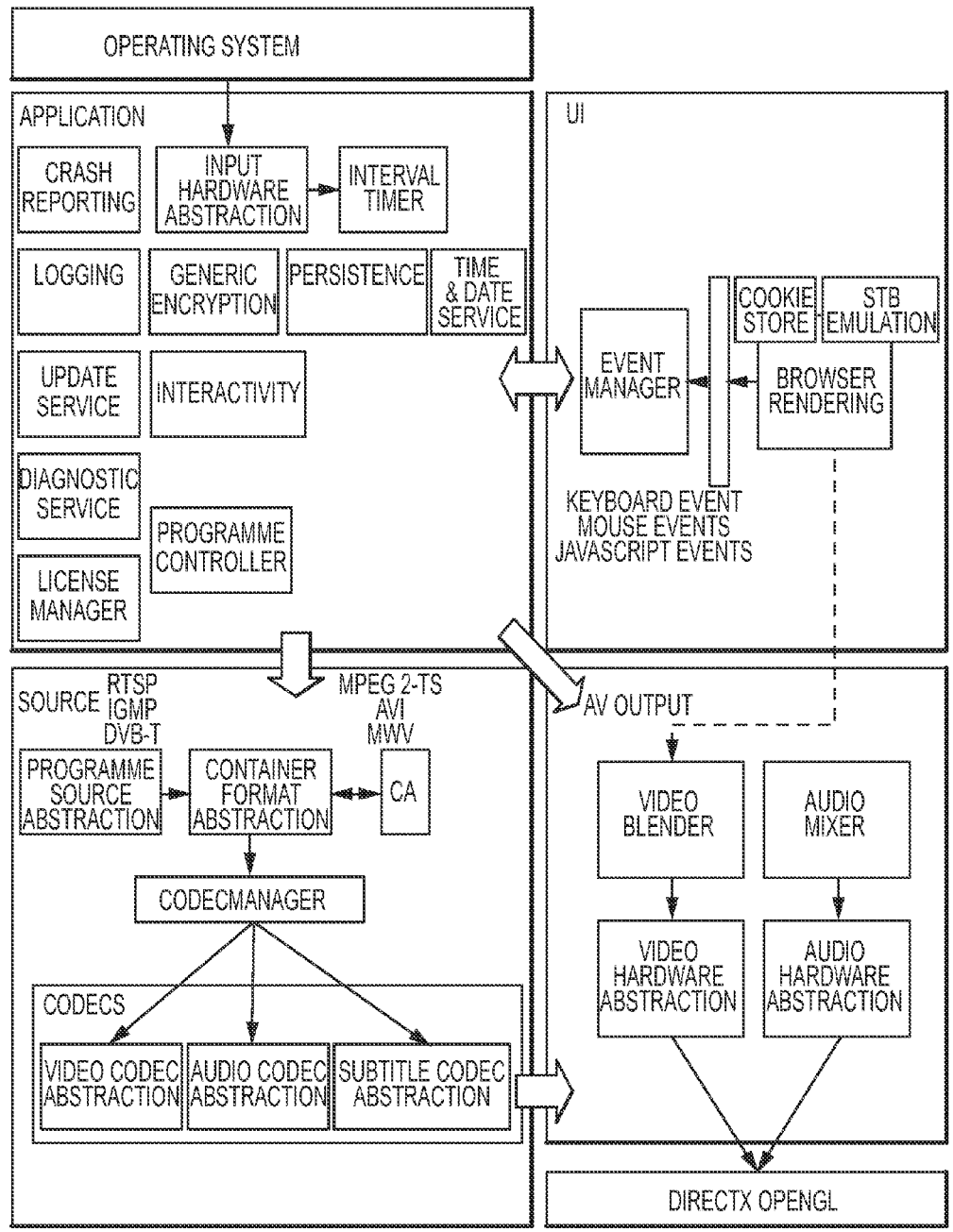
FIG. 23 is a schematic representation of the subsystems utilized in one embodiment and the interaction between them.

The application is implemented in a multi-threaded manner for both performance and resilience purposes. The main thread clusters are split into global threads responsible for overall operation of the application and per channel events which are localized instances responsible for the streams. The global threads look after activities such as event handling, video rendering and audio call-backs, while the per channel threads are responsible for stream based activities such as socket connections, stream parsing and codec management. These thread pools are illustrated in FIG. 21. Overlaid above the thread handling model are specific data flows such as that of the raw data received to AV display and illustrated in FIG. 22. The remaining subsystems of the present invention are illustrated in FIG. 23.

In one embodiment, in order to support the secure storage of application leveled data in the vSTB, a secure cookie store has been implemented within the browser. This may be achieved by modifying the original Mozilla source code and adding a call to a generic encryption library specific to the present application used for the secure properties file. This approach may transparent to both the user and the webpages using the cookies and as a debug feature, the resulting cookies.txt file can be read with the PFE properties profile editor. The generic encryption library provides encryption and decryption features using the "Tiny Encryption Algorithm" (TEA).

Figure 24:
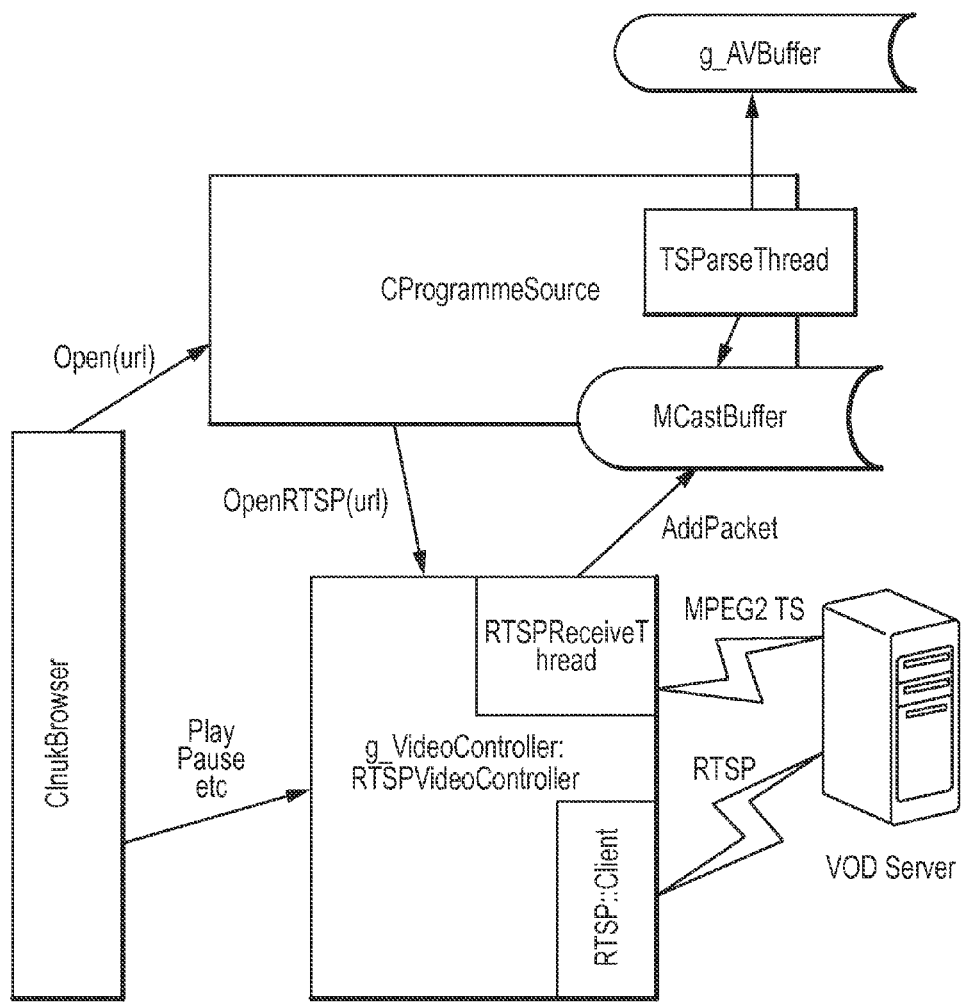
FIG. 24 is a schematic representation of the Real Time Streaming Protocol (RTSP) stack implementation for VOD used in one embodiment.

In one embodiment, the vSTB has a basic RSC2326 RTSP stack implementation augmented by the ability to dynamically detect and alter its behavior based on various dialects of RTSP implemented by the server fenders as illustrated in FIG. 24.

An important advantage of the present invention may be the ability to blend the graphical user interface on top of a moving video stream in a way that is familiar to the user. In other words, the output from the middleware in the vSTB produces the same on-screen menu overlaying or alongside streaming video as its equivalent hardware-based physical STB. Alternatively, the embodiments described herein may provide other advantages as described herein.

One problem that arises relates to color format information. The h.264 codec returns video in YUV format while a browser returns an RGB bitmap requiring one format to be modified to the other. Because SDL does not handle complex YUV functions well, the CPU must be used to perform YUV alpha blending and the merging of the layers. This YUV video must then be converted to RGB in the hardware just prior to displaying on screen as monitors can only display RGB. An immediate advantage of converting the YUV video frames to RGB is that the frames can use the chroma key when a previous frame pixel was the same color as the next frame pixel. This approach also allows de-interlacing of the video and the ability to perform advanced image manipulations.

The YUV to RGB algorithms implemented are extremely fast and also handle color anomalies near the extremes of the RGB color values. A fast clipping function has been developed to enhance performance as well as to improve alpha blending capabilities. Each pixel is tested in order to compare with the chromakey value. Pixels that match the color mask allow the video pixel to be shown through unaltered. Pixels that do not match the chromakey are alpha blended (128 bit) on top of the video layer.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The singular reference of an element does not exclude the plural reference of such elements and vice-versa. Some embodiments may be implemented by means of hardware including several distinct elements, and by means of a suitably programmed computing device. In a device claim enumerating several means, several of these means may be embodied by one and the same item of hardware. The mere fact that certain measures are recited in mutually different dependent claims does not indicate that a combination of these measures cannot be used to advantage.

What is claimed is:

1. A computer-implemented method of dynamic video source selection (DVSS), comprising:
    using a DVSS component operating on an electronic device, determining that the electronic device is located within a network environment in which there are a plurality of sources available for delivering media content to the electronic device, wherein the electronic device is configured to receive and present media content on a display;
    using the DVSS component, selecting one of the plurality of sources for delivering the media content over a delivery network from the selected source to the electronic device based on which of the plurality of sources can deliver the highest quality copy of the media content that is available to the electronic device;
    receiving at the electronic device the media content over the delivery network from the selected source; and
    presenting the media content on the display.

2. The method of claim 1, wherein said presenting comprises presenting the media content using a consistent navigational paradigm to a user, regardless of the selected source.

3. The method of claim 1, wherein said presenting comprises presenting the media content as at least one of a video, a video and text, a video and graphics, a graphical user interface, and a video and a graphical user interface.

4. The method of claim 1, wherein the media content at each of the plurality of sources is the same media content.

5. The method of claim 1, further comprising requesting the media content from the selected source.

6. The method of claim 5, wherein said requesting comprises:
    issuing a request for the media content from one of the plurality of sources that uses a multicast enabled delivery network; and
    upon determining that the request fails, re-issuing the request for the media content from another one of the plurality of sources that is a non-multicast enabled delivery network.

7. The method of claim 6, wherein the request is an Internet Group Management Protocol (IGMP) request, and wherein the re-issued request is a Hypertext Transport Protocol (HTTP) request.

8. The method of claim 5, wherein said requesting comprises:
    issuing a request for the media content from one of the plurality of sources in a closed network infrastructure;
    upon determining that the request fails, re-issuing the request for the media content from another one of the plurality of sources in an open network infrastructure.

9. The method of claim 1, wherein at least one of the plurality of sources is a Digital Video Broadcasting source that delivers the media content over the air, and wherein said receiving comprises receiving the media content over the air without requesting the media content.

10. The method of claim 1, wherein at least one of the plurality of sources uses a multicast enabled delivery network that delivers the media content as Internet Protocol Television (IPTV) content, and at least one of the plurality of sources use a non-multicast enabled delivery network.

11. The method of claim 10, wherein the non-multicast enabled delivery network is a Hypertext Transfer Protocol (HTTP) delivery network, and HTTP delivery network delivers the media content as one or more HTTP streamlets.

12. The method of claim 10, wherein the non-multicast enabled delivery network is a Peer-to-Peer (P2P) delivery network.

13. The method of claim 1, wherein the electronic device is a physical set-top box (STB).

14. The method of claim 1, wherein the electronic device is a computing device operating a STB emulation system.

15. A system, comprising:
an electronic device operating in a network environment in which there are a plurality of sources available for delivering media content to the electronic device, wherein the electronic device is configured to receive and present the media content on a display,
wherein the electronic device comprises a computing device operating a Dynamic Video Source Selection (DVSS) component, wherein the DVSS component is configured to select one of the plurality of sources for delivering the media content over a delivery network from the selected source to the electronic device based on which of the plurality of sources can deliver the highest quality copy of the media content that is available to the electronic device, and
wherein the electronic device is configured to receive the media content over the delivery network from the selected source and to present the media content on the display.

16. The system of claim 15, wherein the electronic device is a physical set-top box.

17. The system of claim 15, wherein the electronic device is a computing device operating a STB emulation system.

18. The system of claim 15, wherein the DVSS component is configured to request the media content by,
issuing a Internet Group Management Protocol (IGMP) request for the media content from one of the plurality of sources that uses a multicast enabled delivery network; and
upon determining that the IGMP request fails, re-issuing the request as Hypertext Transfer Protocol (HTTP) request for the media content from another one of the plurality of sources that is a HTTP delivery network.

19. A machine-readable storage medium storing instruction thereon when executed by a computing device cause the computing device to perform a method, comprising:
determining that the computing device is located within a network environment in which there are a plurality of sources available for delivering media content to the computing, wherein the computing device is configured to receive and present media content on a display;
selecting one of the plurality of sources for delivering the media content over a delivery network from the selected source to the electronic device based on which of the plurality of sources can deliver the highest quality copy of the media content that is available to the electronic device;
receiving the media content over the delivery network from the selected source; and
presenting the media content on the display.

20. The machine-readable storage medium of claim 19, further comprising requesting the media content from the selected source, wherein said requesting comprises:
issuing a request for the media content from one of the plurality of sources that uses a multicast enabled delivery network; and
upon determining that the request fails, re-issuing the request for the media content from another one of the plurality of sources that is a non-multicast enabled delivery network.

* * * * *